United States Patent
Yerramalli et al.

(10) Patent No.: US 11,057,926 B2
(45) Date of Patent: Jul. 6, 2021

(54) PHYSICAL UPLINK SHARED CHANNEL COVERAGE ENHANCEMENTS

(71) Applicant: QUALCOMM Incorporated, San Diego, CA (US)

(72) Inventors: Srinivas Yerramalli, San Diego, CA (US); Chih-Hao Liu, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 15/880,507

(22) Filed: Jan. 25, 2018

(65) Prior Publication Data

US 2018/0227944 A1   Aug. 9, 2018

Related U.S. Application Data

(60) Provisional application No. 62/454,798, filed on Feb. 4, 2017.

(51) Int. Cl.
| | | |
|---|---|---|
| *H04W 72/14* | (2009.01) | |
| *H04W 72/04* | (2009.01) | |
| *H04W 72/12* | (2009.01) | |
| *H04L 1/08* | (2006.01) | |
| *H04W 28/02* | (2009.01) | |
| *H04W 74/08* | (2009.01) | |

(52) U.S. Cl.
CPC ............... *H04W 72/14* (2013.01); *H04L 1/08* (2013.01); *H04W 72/042* (2013.01); *H04W 72/1268* (2013.01); *H04W 28/0215* (2013.01); *H04W 72/1289* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 2008/0062936 A1* | 3/2008 | He | H04W 72/12 370/338 |
| 2011/0243080 A1 | 10/2011 | Chen et al. | |
| 2013/0195031 A1* | 8/2013 | Hessler | H04L 1/1819 370/329 |

(Continued)

FOREIGN PATENT DOCUMENTS

| | | |
|---|---|---|
| WO | WO-2016154899 A1 | 10/2016 |
| WO | WO-2016164584 A1 | 10/2016 |
| WO | WO-2016206650 A1 | 12/2016 |

OTHER PUBLICATIONS

International Search Report and Written Opinion—PCT/US2018/015522—ISA/EPO—dated Jun. 8, 2018.

*Primary Examiner* — Saad Khawar
(74) *Attorney, Agent, or Firm* — Holland & Hart LLP/Qualcomm

(57) ABSTRACT

Methods, systems, and devices for wireless communication are described. A user equipment (UE) may receive an uplink grant that conveys an indication of a multi-transmission opportunity (TxOP) grant. The UE may transmit, during a first TxOP, a first uplink transmission in one or more subframes in accordance with the multi-TxOP grant. The UE may transmit, during a second TxOP, a second uplink transmission in one or more subframes in accordance with the multi-TxOP grant.

30 Claims, 18 Drawing Sheets

(56) References Cited

U.S. PATENT DOCUMENTS

| | | | |
|---|---|---|---|
| 2016/0014804 A1* | 1/2016 | Merlin | H04W 28/065 |
| | | | 370/329 |
| 2016/0100398 A1* | 4/2016 | Xia | H04W 72/0413 |
| | | | 370/330 |
| 2016/0301509 A1* | 10/2016 | Narasimha | H04L 5/0062 |
| 2016/0337094 A1* | 11/2016 | Andreoli-Fang | |
| | | | H04W 72/1284 |
| 2016/0353440 A1* | 12/2016 | Lee | H04W 72/0493 |
| 2017/0019914 A1 | 1/2017 | Rune et al. | |
| 2017/0222776 A1* | 8/2017 | Dinan | H04L 27/0006 |
| 2017/0257190 A1* | 9/2017 | Wang | H04L 1/1816 |
| 2018/0124816 A1 | 5/2018 | Han et al. | |
| 2018/0279340 A1* | 9/2018 | Skordeman | H04W 74/02 |
| 2019/0045544 A1* | 2/2019 | Wang | H04W 74/0808 |
| 2019/0082452 A1* | 3/2019 | Zheng | H04L 5/0007 |

\* cited by examiner

PHYSICAL UPLINK SHARED CHANNEL COVERAGE ENHANCEMENTS

CROSS REFERENCES

The present application for patent claims priority to U.S. Provisional Patent Application No. 62/454,798 by Yerramalli, et al., entitled "Physical Uplink Shared Channel Coverage Enhancements," filed Feb. 4, 2017, assigned to the assignee hereof.

BACKGROUND

The following relates generally to wireless communication, and more specifically to physical uplink shared channel coverage enhancements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some modes of communication may enable communication between a base station and a UE in a shared or unlicensed radio frequency spectrum band. In contrast to a carrier in a licensed spectrum, which may be allocated for use by the devices of a network and may be available to a base station or a UE of that network at predetermined (or all) times, a carrier in shared or unlicensed spectrum may be available intermittently. This intermittent availability may be a result of contention for access to the shared spectrum between devices of different networks (e.g., Wi-Fi devices). The intermittent availability of carriers in a shared or unlicensed spectrum may introduce additional scheduling complexity. In some cases, inefficient scheduling of shared resources may result in reduced throughput for the network devices.

Uplink communications may include transmissions in a physical uplink shared channel (PUSCH) or enhanced PUSCH (ePUSCH). Such uplink communications may use interlacing techniques where the transmission waveforms may be transmitted using a predetermined number of allocated resources (e.g., ten resource blocks (RBs)). Other techniques may include transport block scaling (TBS) which, while useful, may not provide a sufficient coverage enhancement when using a single interlace (which may use all of the available UE transmit power).

SUMMARY

The described techniques relate to improved methods, systems, devices, or apparatuses that support physical uplink shared channel (PUSCH) coverage enhancements. Generally, the described techniques provide for multi-transmission opportunity (TxOP) scheduling where the number of repetitions of the uplink information is indicated in the uplink grant. The split of the repetitions between different TxOPs may be carried or otherwise indicated in the uplink grant. A trigger may be used to provide an indication of the continuation of repetitions of the uplink transmission from previous TxOP(s) and may also start the subframe. In some aspects, a base station acquired TxOP using one interlaced transmission may include multi-TxOP scheduling with time repetition as a baseline scheduling scheme for PUSCH. Transport block scaling (TBS) may be used, in some configurations. When scheduled with full interlace transmission, TBS may be selected to provide gain over a single interlaced waveform.

A method of wireless communication is described. The method may include receiving an uplink grant that conveys an indication of a multi-TxOP grant, transmitting, during a first TxOP, a first uplink transmission in one or more subframes in accordance with the multi-TxOP grant, and transmitting, during a second TxOP, a second uplink transmission in one or more subframes in accordance with the multi-TxOP grant.

An apparatus for wireless communication is described. The apparatus may include means for receiving an uplink grant that conveys an indication of a multi-TxOP grant, means for transmitting, during a first TxOP, a first uplink transmission in one or more subframes in accordance with the multi-TxOP grant, and means for transmitting, during a second TxOP, a second uplink transmission in one or more subframes in accordance with the multi-TxOP grant.

Another apparatus for wireless communication is described. The apparatus may include a processor, memory in electronic communication with the processor, and instructions stored in the memory. The instructions may be operable to cause the processor to receive an uplink grant that conveys an indication of a multi-TxOP grant, transmit, during a first TxOP, a first uplink transmission in one or more subframes in accordance with the multi-TxOP grant, and transmit, during a second TxOP, a second uplink transmission in one or more subframes in accordance with the multi-TxOP grant.

A non-transitory computer-readable medium for wireless communication is described. The non-transitory computer-readable medium may include instructions operable to cause a processor to receive an uplink grant that conveys an indication of a multi-TxOP grant, transmit, during a first TxOP, a first uplink transmission in one or more subframes in accordance with the multi-TxOP grant, and transmit, during a second TxOP, a second uplink transmission in one or more subframes in accordance with the multi-TxOP grant.

Some examples of the method, apparatus, and non-transitory computer-readable medium described above may further include processes, features, means, or instructions for receiving a trigger indicator in one or both of the first and second TxOPs during a subframe that may be before the subframe in which the first or second uplink transmissions may be transmitted, the trigger indicator indicating that repetitive uplink transmissions may be permitted to be transmitted during the first or second TxOPs.

In some examples of the method, apparatus, and non-transitory computer-readable medium described above, the trigger indication comprises at least one of an on/off indication or a sequence number for the trigger indicator using one or more bits of the trigger indicator.

Some examples of the method, apparatus, and non-transitory computer-readable medium described above may further include processes, features, means, or instructions for monitoring a configured set of bits in a common control signaling to determine the sequence number for the trigger indicator.

In some examples of the method, apparatus, and non-transitory computer-readable medium described above, the one or more bits of the trigger indicator may be based at least in part on a resource identifier indicated in a downlink control indicator (DCI).

Some examples of the method, apparatus, and non-transitory computer-readable medium described above may further include processes, features, means, or instructions for scaling one or more transport block sizes prior to transmitting the first and second uplink transmissions, the scaling performed according to a transport block scaling factor.

Some examples of the method, apparatus, and non-transitory computer-readable medium described above may further include processes, features, means, or instructions for transmitting a dense reference signal during a first uplink subframe of one or both of the first and second TxOPs.

Some examples of the method, apparatus, and non-transitory computer-readable medium described above may further include processes, features, means, or instructions for identifying an interlace factor associated with the first and second uplink transmissions. Some examples of the method, apparatus, and non-transitory computer-readable medium described above may further include processes, features, means, or instructions for interlacing the first and second uplink transmissions according to the interlace factor.

Some examples of the method, apparatus, and non-transitory computer-readable medium described above may further include processes, features, means, or instructions for performing a listen-before-talk (LBT) procedure before transmitting the first and second uplink transmissions.

Some examples of the method, apparatus, and non-transitory computer-readable medium described above may further include processes, features, means, or instructions for determining that a predetermined number of LBT procedures associated with the first or second uplink transmissions may have failed. Some examples of the method, apparatus, and non-transitory computer-readable medium described above may further include processes, features, means, or instructions for discarding the multi-TxOP grant.

In some examples of the method, apparatus, and non-transitory computer-readable medium described above, the predetermined number of LBT procedure failures may be based at least in part on a repetition indicator.

In some examples of the method, apparatus, and non-transitory computer-readable medium described above, the first TxOP and the second TxOP may be the same, and wherein the uplink grant may be received in a TxOP other than the first or second TxOPs.

In some examples of the method, apparatus, and non-transitory computer-readable medium described above, the first TxOP and the second TxOP may be different, and wherein the uplink grant may be received in the first TxOP.

In some examples of the method, apparatus, and non-transitory computer-readable medium described above, the first TxOP comprises a base station acquired TxOP and the second TxOP comprise a user equipment (UE) acquired TxOP.

In some examples of the method, apparatus, and non-transitory computer-readable medium described above, the uplink grant further conveys an indication of at least one of a repetition indicator, an associated transport block scaling factor, or a combination thereof.

A method of wireless communication is described. The method may include transmitting an uplink grant that conveys an indication of a multi-TxOP grant, receiving, during a first TxOP, a first uplink transmission in one or more subframes in accordance with the multi-TxOP grant, and receiving, during a second TxOP, a second uplink transmission in one or more subframes in accordance with the multi-TxOP grant.

An apparatus for wireless communication is described. The apparatus may include means for transmitting an uplink grant that conveys an indication of a multi-TxOP grant, means for receiving, during a first TxOP, a first uplink transmission in one or more subframes in accordance with the multi-TxOP grant, and means for receiving, during a second TxOP, a second uplink transmission in one or more subframes in accordance with the multi-TxOP grant.

Another apparatus for wireless communication is described. The apparatus may include a processor, memory in electronic communication with the processor, and instructions stored in the memory. The instructions may be operable to cause the processor to transmit an uplink grant that conveys an indication of a multi-TxOP grant, receive, during a first TxOP, a first uplink transmission in one or more subframes in accordance with the multi-TxOP grant, and receive, during a second TxOP, a second uplink transmission in one or more subframes in accordance with the multi-TxOP grant.

A non-transitory computer-readable medium for wireless communication is described. The non-transitory computer-readable medium may include instructions operable to cause a processor to transmit an uplink grant that conveys an indication of a multi-TxOP grant, receive, during a first TxOP, a first uplink transmission in one or more subframes in accordance with the multi-TxOP grant, and receive, during a second TxOP, a second uplink transmission in one or more subframes in accordance with the multi-TxOP grant.

Some examples of the method, apparatus, and non-transitory computer-readable medium described above may further include processes, features, means, or instructions for transmitting a trigger indicator in at least one of the first or second TxOPs during a subframe that may be before the subframe in which the first or second uplink transmissions may be received, the trigger indicator indicating that repetitive uplink transmissions may be permitted to be transmitted during the first or second TxOPs.

Some examples of the method, apparatus, and non-transitory computer-readable medium described above may further include processes, features, means, or instructions for receiving a dense reference signal during a first uplink subframe of one or both of the first and second TxOPs.

In some examples of the method, apparatus, and non-transitory computer-readable medium described above, the first TxOP and the second TxOP may be the same, and wherein the uplink grant may be received in a TxOP other than the first or second TxOPs.

In some examples of the method, apparatus, and non-transitory computer-readable medium described above, the first TxOP and the second TxOP may be different, and wherein the uplink grant may be received in the first TxOP.

In some examples of the method, apparatus, and non-transitory computer-readable medium described above, the first TxOP comprises a base station acquired TxOP and the second TxOP comprise a UE acquired TxOP.

DETAILED DESCRIPTION

Figure 1:
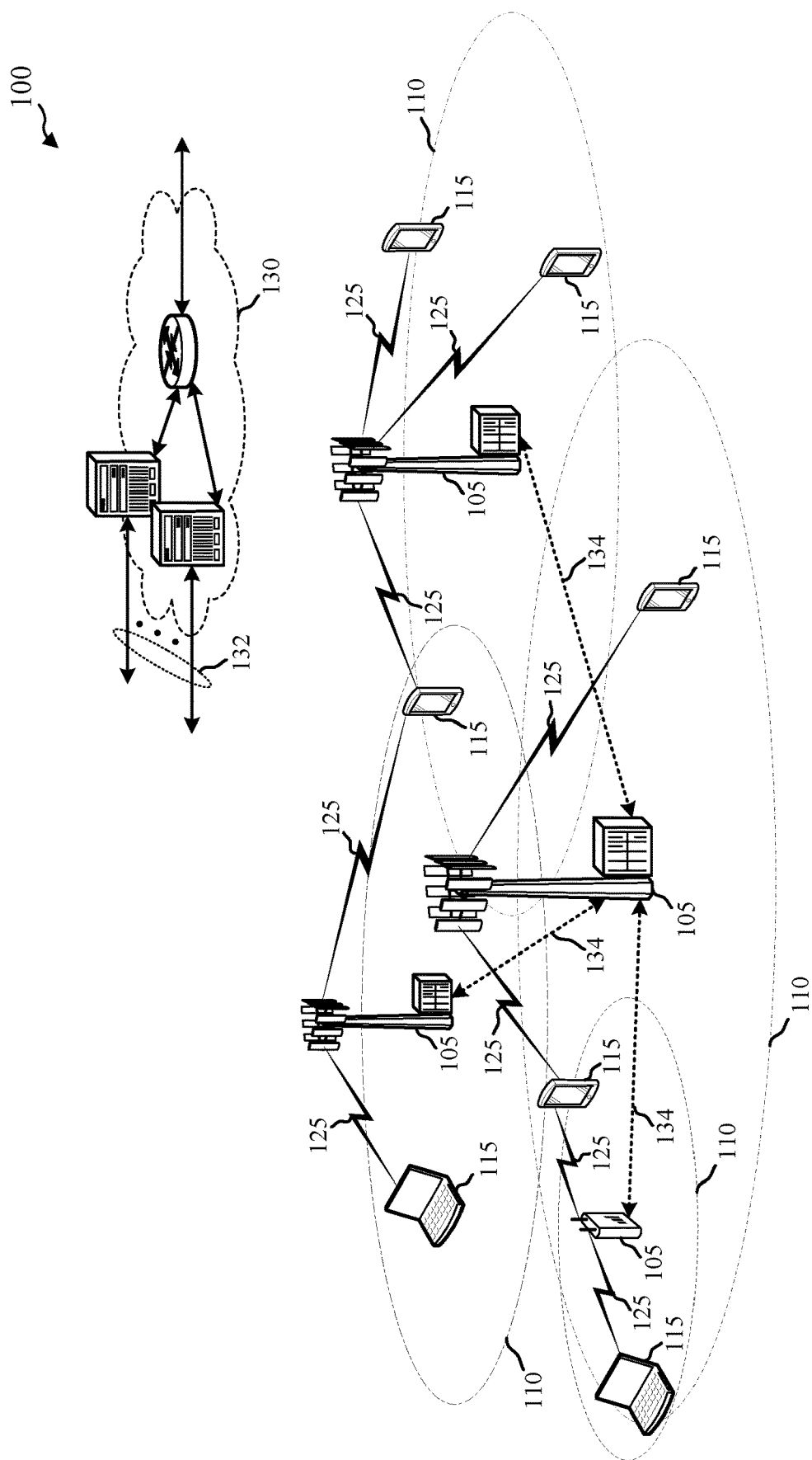
FIG. 1 illustrates an example of a system for wireless communication that supports physical uplink shared channel (PUSCH) coverage enhancements in accordance with aspects of the present disclosure.

User equipment (UE) and/or base stations within a wireless system operating in a shared or unlicensed radio frequency spectrum band (e.g., a MulteFire or other stand-alone shared spectrum system) may initiate a channel clearance procedure between the UE and base station in order to gain the medium and reduce potential collisions. In such scenarios, a UE and/or base station may perform a clear channel assessment (CCA) (such as a listen-before-talk (LBT) procedure) in an attempt to access the medium. Following a successful CCA procedure, the UE and/or base station may transmit a busy signal (e.g., to reserve the channel) prior to initiating channel clearance signaling, such as a request-to-send/clear-to-send (RTS/CTS) handshake. For example, the UE may transmit a channel clearance signal (e.g., an RTS) following the busy signal, which may prompt a base station to respond with a corresponding second channel clearance signal (e.g., a CTS). The UE may then begin transmission (e.g., physical uplink shared channel (PUSCH) transmission) upon receiving the second channel clearance signal. Such techniques may reduce intra-cell UE ambiguity and transmission collisions and may thus result in improved system performance (e.g., due to more efficient contention procedures, timing synchronization, etc.). In some cases, the UE may transmit a signal to indicate that it intends to occupy the shared medium; this signal may be referred to as a busy signal and may serve as the first channel clearance signal.

In some cases, a UE and base station may exchange control signaling in the channel clearance signaling. For example, base station channel clearance signaling may include a modulation and coding scheme (MCS) for an autonomous uplink mode, a transmission opportunity (TxOP) duration for an autonomous uplink mode, hybrid automatic repeat request (HARM) information for an autonomous uplink mode, and the like. UE channel clearance signaling may also include control signaling (e.g., UE identification information). Including such control information in channel clearance signaling may reduce the need for subsequent control signaling. In some cases, the channel clearance signaling may include preambles (e.g., Wi-Fi waveform-like signaling), in which case timing synchronization (e.g., alignment of subframe boundaries) may already be achieved. Such traditional control signaling techniques and resulting uplink transmissions may provide limited PUSCH coverage.

Aspects of the disclosure are initially described in the context of a wireless communications system, e.g., a MulteFire system. The wireless communication system may be configured to provide PUSCH coverage enhancements, e.g., in the MulteFire configured system. For example, a base station may be configured to identify, configure, and provide an uplink grant to a UE that carriers or otherwise conveys an indication of a multi-TxOP grant where the UE provides uplink transmissions in other TxOPs (e.g., in TxOP(s) other than the subframe, TxOP, etc., in which the UE receives the uplink grant). Additionally or alternatively, the uplink grant may also carry or convey an indication of a repetition indicator that indicates the number of repetitions of the uplink information on a per-TxOP basis. Additionally or alternatively, the uplink grant may also carry or convey an indication of the transport block scaling (TBS) factor. The TBS factor may provide an indication of the TBS that the UE is to use during the uplink transmissions. In some aspects, a trigger and/or a reference signal (such as a dense reference signal (dRS)) may be used to identify the beginning of the uplink transmission during a TxOP. In some aspects, the base station may enable contiguous transmissions from the UE by selecting a repetition factor of (0,x), where 0 indicates that the uplink transmission occurs outside of the subframe, TxOP, etc., that carries the uplink grant and the x indicates the number of repetitions of the uplink information in a subsequent TxOP.

Aspects of the disclosure are further illustrated by and described with reference to apparatus diagrams, system diagrams, and flowcharts that relate to PUSCH coverage enhancements.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE) (or LTE-Advanced) network, or a New Radio (NR) network. In some cases, wireless communication system 100 may support enhanced broadband communications, ultra-reliable (i.e., mission critical) communications, low latency communications, and communications with low-cost and low-complexity devices. In some examples, wireless communication system 100 may include an LTE/LTE-A network, a MulteFire network, a neutral host small cell network, or the like, operating with overlapping coverage areas.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or Internet-of-Things (IoT) devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra high frequency (UHF) frequency region using frequency bands from 700 MHz to 2600 megahertz (MHz) (2.6 gigahertz (GHz)), although in some cases networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, which may support beamforming or multiple-input/multiple-output (MIMO) operations. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, wireless communication system 100 may be or include a MulteFire network. MulteFire networks may include access points (APs) and/or base stations 105 communicating in an unlicensed radio frequency spectrum band, e.g., without a licensed frequency anchor carrier. For example, the MulteFire network may operate without an anchor carrier in the licensed spectrum. Wireless communication system 100 may support frame structure signaling, which may, e.g., increase the efficiency of MulteFire communications within wireless communication system 100. In a MulteFire network, UEs 115 and base stations 105 may contend for access to frequency bands with other devices and networks. Thus, UEs 115 and base stations 105 may perform CCA procedures (e.g., LBT procedures), and may transmit during dynamically determined TxOPs.

A UE 115 may be configured to support aspect(s) of the described techniques for PUSCH coverage enhancements. For example, the UE 115 may receive an uplink grant that conveys an indication of a multi-TxOP grant. The UE 115 may transmit, during a first TxOP, a first uplink transmission in one or more subframes in accordance with the multi-TxOP grant. The UE 115 may transmit, during a second TxOP, a second uplink transmission in one or more subframes in accordance with the multi-TxOP grant.

A base station 105 may be configured to support aspect(s) of the described techniques for PUSCH coverage enhancements. For example, the base station 105 may transmit an uplink grant that conveys an indication of a multi-TxOP grant. The base station 105 may receive, during a first TxOP, a first uplink transmission in one or more subframes in accordance with the multi-TxOP grant. The base station 105 may receive, during a second TxOP, a second uplink transmission in one or more subframes in accordance with the multi-TxOP grant.

Figure 2:
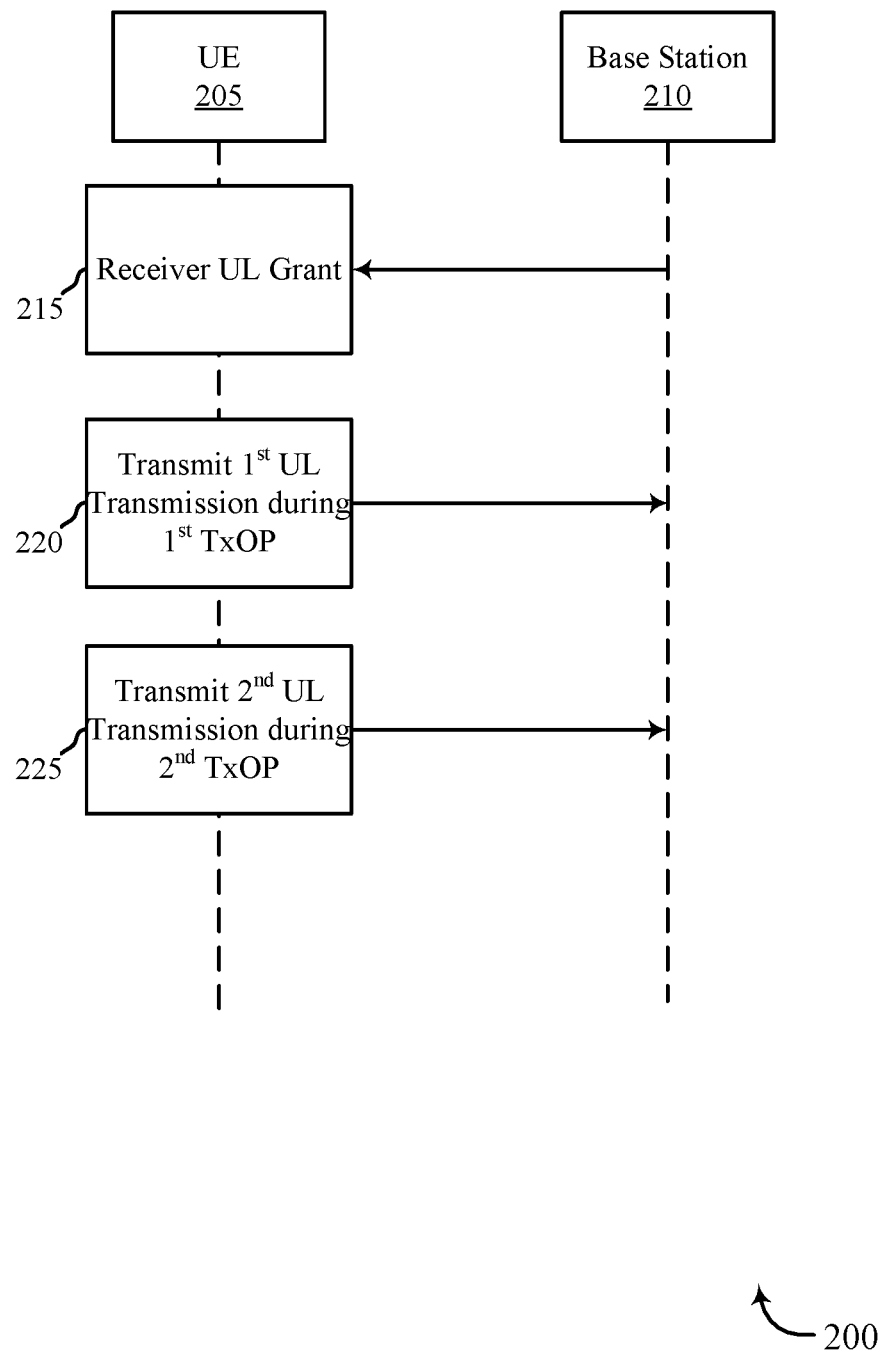
FIG. 2 illustrates an example of a process that supports PUSCH coverage enhancements in accordance with aspects of the present disclosure.

FIG. 2 illustrates an example of a process 200 that supports PUSCH coverage enhancements in accordance with various aspects of the present disclosure. Process 200 may implement aspect(s) of wireless communication system 100 discussed herein. Process 200 may include a UE 205 and a base station 210, which may be examples of the corresponding devices described herein. In some aspects, process 200 may be implemented in a MulteFire configured wireless communication system.

At 215, the UE 205 may receive (and base station 210 may transmit) an uplink grant. In some examples, the uplink grant may be transmitted in an unlicensed (or shared) spectrum. The uplink grant may include a multi-TxOP grant that conveys an indication of resources to be used by UE 205 in subsequent uplink transmissions. The uplink resources may span multiple TxOPs, may identify a TxOP outside of the subframe/TxOP carrying the uplink grant, and the like. The multi-TxOP grant may indicate which TxOPs that UE 205 uses to transmit the uplink transmissions.

The uplink grant may include a repetition indicator, in some aspects. The repetition indicator may provide a structure of uplink transmissions repeated across TxOP(s). The repetition indicator may include additional repetitions, e.g., extra repetitions of the uplink transmissions that are added in case the UE 205 cannot capture the medium for the uplink transmissions. The base station 210 may select the repetition factor based on the amount of traffic congestion, reliability factor associated with the uplink transmissions, priority level of the UE 205, and the like.

The uplink grant may include a transport block scaling factor, which may provide an indication of the scaling to be applied to transport blocks in the uplink transmissions on the resources identified in the uplink grant.

In some aspects, UE 205 and base station 210 may exchange uplink transmissions on PUSCH, physical uplink control channel (PUCCH), or other similar channels. The PUSCH channel, for example, may take multiple forms. A PUSCH may include resources from portions of several resource blocks. For example, PUSCH may be interleaved or interlaced with other transmissions within resource blocks. Interlacing resources may result in different amplitudes for symbol(s) in the uplink transmission. In some cases, PUSCH transmissions from several UEs may be interleaved or interlaced within a set of resource blocks.

PUSCH transmission may also use aspect(s) of TBS according to the TBS factor. The size of the transport block may be scaled (e.g., reduced or enlarged) in size according to the TBS factor, e.g., the transport block may be scaled downward by the TBS factor. In one example, the TBS factor may be 0.1, 0.5, etc. for an uplink transmission. Other TBS factors may also be used.

At 220, the UE 205 may transmit (and base station 210 may receive) a first uplink transmission during a first TxOP. In some examples, the first uplink transmission may be transmitted in the unlicensed spectrum. The uplink transmission may be transmitted in subframe(s) of the TxOP in accordance with the uplink grant, e.g., the multi-TxOP grant.

At 225, the UE 205 may transmit (and base station 210 may receive) a second uplink transmission during a second TxOP. In some examples, the second uplink transmission may be transmitted in the unlicensed spectrum. The second uplink transmission may be transmitted in subframe(s) of the TxOP in accordance with the uplink grant, e.g., the multi-TxOP grant.

In some aspects, the first and/or second uplink transmissions may be based on a trigger. For example, the UE 205 may receive a trigger from base station 210 during the first and/or second TxOPs. The trigger may be received in a subframe occurring prior to the subframe of the TxOP that the uplink transmissions are being transmitted. The trigger may indicate that the uplink transmissions are repetitive uplink transmissions being transmitted during the first and/or second TxOPs.

In some aspects, the trigger indication may include an on/off indication, a sequence number for the trigger indicator using bit(s) of the trigger indicator, and the like. For example, the UE 205 may monitor a configured set of bits in a common control signal to determine the sequence number for the trigger indicator. In some aspects, the bit(s) of the trigger indicator are based at least in part on a resource identifier indicated in a downlink control indicator (DCI).

When TBS is configured, the UE 205 may scale transport block(s) before being transmitted in the uplink transmission(s). For example, the UE 205 may scale the transport block(s) using the TBS factor that may be included in the uplink grant.

In some aspects, UE 205 may transmit a reference signal (RS), such as a dense RS (dRS), before transmitting the uplink transmission(s). For example, UE 205 may transmit the dRS during the first uplink subframe of the TxOP(s) in which the uplink transmissions are being transmitted. The dRS may provide an indication to base station 210 that the uplink transmissions follow the dRS.

In some aspects, UE 205 may interlace the first and/or second uplink transmissions. For example, UE 205 may receive an indication of, identify, or otherwise determine an interlacing factor for the uplink transmission(s) and interlace the uplink transmission(s) accordingly.

In some aspects, UE 205 may perform LBT procedure(s) before transmitting the first and/or second uplink transmissions. The LBT procedure may provide for the UE 205 to capture the medium for the uplink transmissions. The UE 205 may perform the LBT procedure before each of the first and second uplink transmissions. In some aspects, the UE 205 may discard the uplink grant when a predetermined number of LBT procedures fail. For example, when an LBT procedure in one subframe of a TxOP fails, the UE 205 may attempt another LBT procedure in the next subframe of the TxOP. If the second LBT procedure fails, the UE 205 may attempt a third LBT procedure in the following subframe. After a predetermined number of LBT procedures fail within a given TxOP and/or for both TxOPs, the UE 205 may determine that the medium is congested and therefore discard the uplink grant. Base station 210 may, after a predetermined number of TxOPs and/or time period, determine that the uplink transmissions have failed and retransmit a second uplink grant to UE 205.

In some aspects, the first and second TxOPs may be different. In one example, the first TxOP may be the same TxOP that the uplink grant is received in and the second TxOP may be a subsequent TxOP. In other aspects, the first and second TxOPs may be the same. For example, the base station 210 may transmit the uplink grant during a TxOP and then receive the first and second uplink transmissions during the subsequent TxOP.

Figure 3:
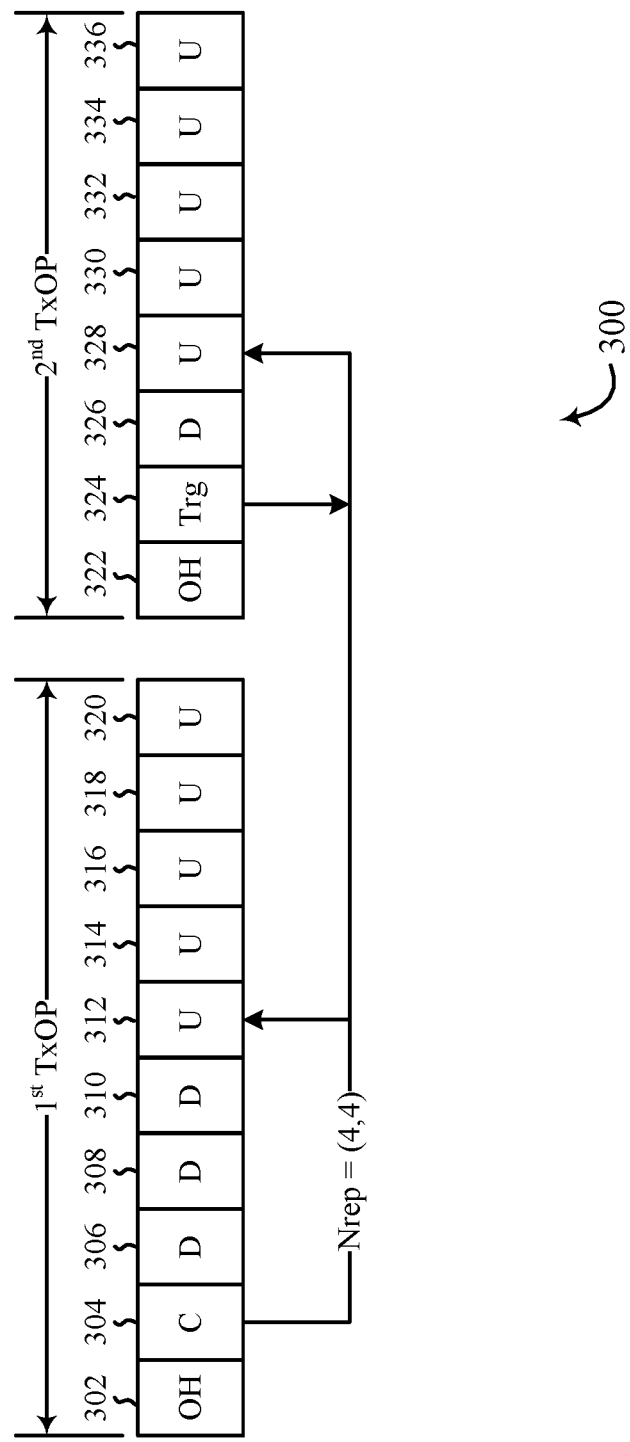
FIG. 3 illustrates an example of a uplink configuration that supports PUSCH coverage enhancements in accordance with aspects of the present disclosure.

FIG. 3 illustrates an example of a PUSCH configuration 300 that supports PUSCH coverage enhancements in accordance with various aspects of the present disclosure. PUSCH configuration 300 may implement aspect(s) of wireless communication system 100 and/or process 200 described above. Aspects of PUSCH configuration 300 may be implemented by a UE and/or a base station, which may be examples of the corresponding devices described herein.

Generally, PUSCH configuration 300 illustrates an example of two TxOPs, e.g., a first TxOP and a second TxOP. Each TxOP includes a number of subframes. In the example PUSCH configuration 300, the first TxOP includes subframes 302, 304, 306, 308, 310, 312, 314, 316, 318, and 320, e.g., ten subframes. In the example PUSCH configuration 300, the second TxOP includes subframes 322, 324, 326, 328, 330, 332, 334, and 336, e.g., eight subframes. It is to be understood that the first and second TxOPs are not limited to ten and eight subframes, respectively, and that either TxOP may have more or less subframes.

Each TxOP may have different subframe types. For example, each TxOP may have an overhead subframe (e.g., subframes 302 and 322) that may be used to exchange overhead information for the respective TxOP. Example overhead information may include the number of subframes in the TxOP, modulation and coding scheme (MCS) used for communication during the TxOP, and the like. Another subframe type may include a control subframe (e.g., subframes 304 and 324). The control subframe may include control information being exchanged between UEs and a base station. In some examples, the control subframe may carry the uplink grant, a trigger indication, and the like. Other example subframe types may include, but are not limited to, downlink subframes (e.g., subframes 306, 308, 310, and 326) and uplink subframes (e.g., subframes 312, 314, 316, 318, 320, 328, 330, 332, 334, and 336). Each TxOP may have a different number of subframes, a different collection of subframe types and/or, for each subframe type, a different number of subframes. As one example, the first TxOP includes three downlink subframes and five uplink subframes and the second TxOP includes one downlink subframe and five uplink subframes.

The UE and base station may use PUSCH configuration 300 to perform aspects of the described techniques for PUSCH coverage enhancements. For example, the base station may transmit an uplink grant in subframe 304 of the first TxOP. The uplink grant may include the indication of the multi-TxOP grant and, in some examples, the repetition indicator, and the TBS factor, as is discussed herein. In the example PUSCH configuration 300, the repetition factor may be 4, 4, which indicates that the UE is to transmit four repetitions of the uplink data in the first TxOP and four more repetitions of the uplink data in the second TxOP. Thus, the UE may transmit the four repetitions of the uplink information (e.g., the first uplink transmission) during the four subframes of the first TxOP starting at subframe 312 and proceeding through subframes 314, 316, and 318. The UE may attempt to transmit the four repetitions of the uplink data (e.g., the second uplink transmission) during the four subframes of the second TxOP starting at subframe 328 and proceeding through subframes 330, 332, 334, and 336. The second uplink transmission may be triggered based on a trigger transmitted by the base station during subframe 324 of the second TxOP.

In some aspects, PUSCH may use interlace based waveforms with a predetermined number of allocations, e.g., 10 RBs. The TBS, while useful, may not provide sufficient coverage extension when using one interlace, which consumes all the transmit power of the UE.

In some aspects, for multi-TxOP based trigger, a cross-TxOP scheduling mechanism may be used. The number of repetitions and the split of the repetitions between the first and second TxOPs may be indicated in the UL grant. The trigger may indicate to the base station the continuation of repetitions from the previous TxOP and also the start or initial subframe. Due to delay between the uplink scheduling and start of uplink transmissions, multi-TxOP scheduling and trigger may be supported in a wireless communication system, e.g., a MulteFire network.

PUSCH configuration 300 may provide for, within a base station acquired TxOP when using one interlace based transmissions, multi-TxOP scheduling with time repetition as the baseline scheduling scheme for PUSCH. In one example, a TBS factor of 0.5 may be used. In an example configuration scheduled with full interlace transmissions, a TBS factor of 0.1 may provide increased gain (e.g., 2-3 dB gain) over using one interlace waveform (e.g., one interlace may use 20 dBm, while full bandwidth interlacing may use 22.xx dBm).

Figure 4:
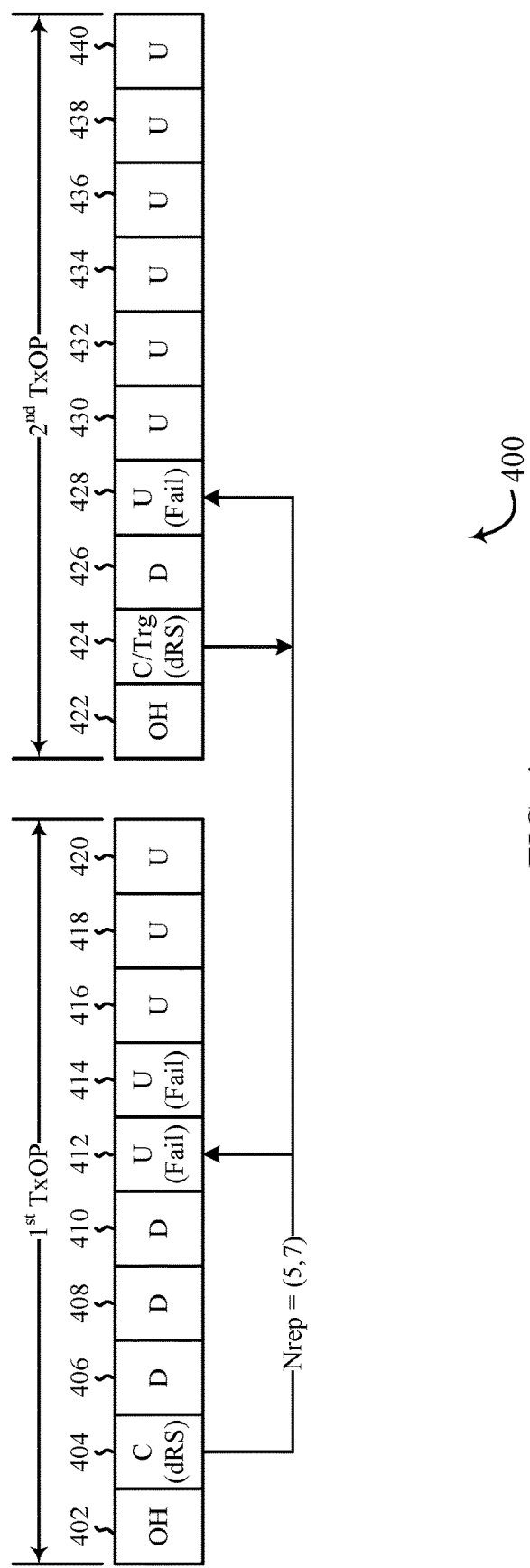
FIG. 4 illustrates an example of a uplink configuration that supports PUSCH coverage enhancements in accordance with aspects of the present disclosure.

FIG. 4 illustrates an example of a PUSCH configuration 400 that supports PUSCH coverage enhancements in accordance with various aspects of the present disclosure. PUSCH configuration 400 may implement aspect(s) of wireless communication system 100 and/or process 200 described above. PUSCH configuration 400 may implement aspects of PUSCH configuration 300 described herein. Aspects of PUSCH configuration 400 may be implemented by a UE and/or a base station, which may be examples of the corresponding devices described herein.

Generally, PUSCH configuration 400 illustrates an example of two TxOPs, e.g., a first TxOP and a second TxOP. Each TxOP includes a number of subframes. In the example PUSCH configuration 400, the first TxOP includes subframes 402, 404, 406, 408, 410, 412, 414, 416, 418, and 420, e.g., ten subframes. In the example PUSCH configuration 400, the second TxOP includes subframes 422, 424, 426, 428, 430, 432, 434, 436, 438, and 440, e.g., ten subframes. It is to be understood that the first and second TxOPs are not limited to ten subframes, respectively, and that either TxOP may have more or less subframes. As is discussed above, each TxOP may have different subframe types. Moreover, each TxOP may have a different number of subframes, a different collection of subframe types and/or, for each subframe type, a different number of subframes.

The UE and base station may use PUSCH configuration 400 to perform aspects of the described techniques for PUSCH coverage enhancements. For example, the base station may transmit an uplink grant in subframe 404 of the first TxOP. The uplink grant may include the indication of the multi-TxOP grant and, in some examples, the repetition indicator, and the TBS factor, as is discussed herein. The uplink grant may also carry or otherwise convey an indication of a dRS to the UE. The dRS indication may be used by the UE for transmission of dRS signals. In the example PUSCH configuration 400, the repetition factor may be 5, 7, which indicates that the UE is to transmit five repetitions of the uplink data in the first TxOP and seven more repetitions of the uplink data in the second TxOP.

Aspect(s) of the PUSCH configuration 400 may illustrate the impact of the UE performing a LBT procedure before transmitting the uplink transmissions. In some aspects, within a base station acquired TxOP, UE transmissions may be subject to a LBT procedure. This may resolve any uncertainty of UE transmissions at the base station.

In traditional configurations, each subframe may be individually scheduled (possibly by a multi-transmit time interval (TTI) grant). However, the non-transmissions or failure of the UE to transmit during a subframe may have no impact on the UE transmitting in the next subframe. This may not be the case for UEs which use the described techniques for PUSCH coverage extension as transmissions in upcoming subframes is an extension of what is transmitted in the current subframe. For example, the base station may schedule more repetitions than is needed to account for probability of channel access failure. The base station may use a TBS factor of 0.5 to reduce the number of repetitions needed, but may limit the TBS factor in considerations of spectral efficiency. In some configuration, with a 10 ms duration and current scheduling delays, a maximum of 12 repetitions may be scheduled in two TxOPs. Thus, in the example PUSCH configuration 400, the base station may schedule a total of 12 repetitions even though eight (for example) repetitions are needed.

Thus, the UE may attempt to transmit the five repetitions of the uplink information (e.g., the first uplink transmission) during the four subframes of the first TxOP starting at subframe 412 and proceeding through subframes 414, 416, 418, and 420. The UE, however, may perform an unsuccessful LBT procedure during the subframes 412 and 414 and the uplink transmission may fail during those subframes. The UE may perform another LBT procedure during the subframe 416, which may be successful, and the uplink transmission may proceed during that subframe. The UE may continue transmitting the first uplink transmission during subframes 418 and 420 of the first TxOP.

During the second TxOP, the base station may transmit a trigger during subframe 424 to initiate the uplink transmission. The UE may attempt to transmit the seven repetitions of the uplink data (e.g., the second uplink transmission) during the seven subframes of the second TxOP starting at subframe 428 and proceeding through subframes 430, 432, 434, 436, 438, and 440. However, a LBT procedure during subframe 428 may also fail, preventing the uplink transmission during that subframe. The LBT procedure during subframe 430, however, may be successful and the UE may perform the second uplink transmission during the subframes 430, 432, 434, 436, 438, and 440. Thus, the UE may transmit nine total repetitions during the first and second TxOPs, which may be sufficient to provide the appropriate number of repetitions and yet provide for possible failures during a certain number of subframes.

Figure 5:
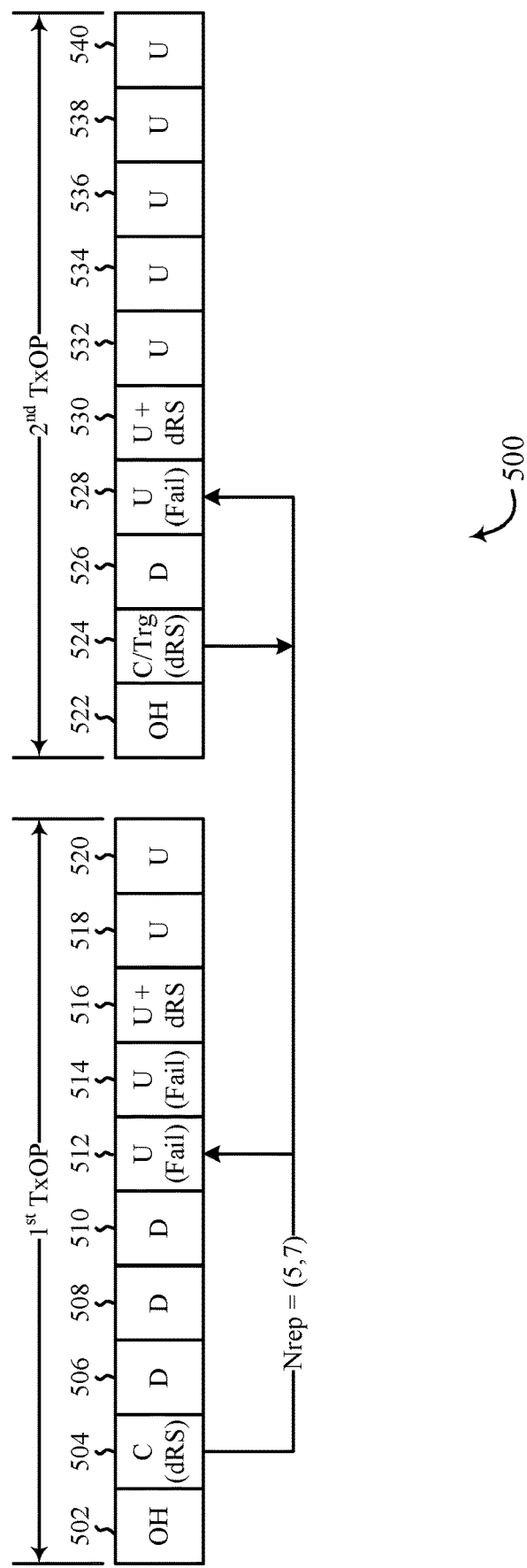
FIG. 5 illustrates an example of a uplink configuration that supports PUSCH coverage enhancements in accordance with aspects of the present disclosure.

FIG. 5 illustrates an example of a PUSCH configuration 500 that supports PUSCH coverage enhancements in accordance with various aspects of the present disclosure. PUSCH configuration 500 may implement aspect(s) of wireless communication system 100 and/or process 200 described above. PUSCH configuration 500 may implement aspects of PUSCH configurations 300 and/or 400 described herein. Aspects of PUSCH configuration 500 may be implemented by a UE and/or a base station, which may be examples of the corresponding devices described herein.

Generally, PUSCH configuration 500 illustrates an example of two TxOPs, e.g., a first TxOP and a second TxOP. Each TxOP includes a number of subframes. In the example PUSCH configuration 500, the first TxOP includes subframes 502, 504, 506, 508, 510, 512, 514, 516, 518, and 520, e.g., ten subframes. In the example PUSCH configuration 500, the second TxOP includes subframes 522, 524, 526, 528, 530, 532, 534, 536, 538, and 540, e.g., ten subframes. It is to be understood that the first and second TxOPs are not limited to ten subframes, respectively, and that either TxOP may have more or less subframes. As is discussed above, each TxOP may have different subframe types. Moreover, each TxOP may have a different number of subframes, a different collection of subframe types and/or, for each subframe type, a different number of subframes.

The UE and base station may use PUSCH configuration 500 to perform aspects of the described techniques for PUSCH coverage enhancements. For example, the base station may transmit an uplink grant in subframe 504 of the first TxOP. The uplink grant may include the indication of the multi-TxOP grant and, in some examples, the repetition indicator, and the TBS factor, as is discussed herein. The uplink grant may also carry or otherwise convey an indication of a dRS to the UE. The dRS indication may be used by the UE for transmission of dRS signals. In the example PUSCH configuration 500, the repetition factor may be 5, 7, which indicates that the UE is to transmit five repetitions of the uplink data in the first TxOP and seven more repetitions of the uplink data in the second TxOP.

Aspect(s) of the PUSCH configuration 500 may illustrate an example of how the base station may know when the UE starts the uplink transmission(s). In some aspects, the UE may include a dRS in the first subframe of the uplink transmission in each TxOP. In some aspects, the UE may transmit the dRS during the first subframe of each TxOP that the UE successfully captures the medium, e.g., using an LBT procedure. The base station may use the transmitted dRS to detect the uplink transmission in each TxOP. The base station may know the number of repetitions scheduled for each TxOP and the location of the dRS and can determine the number of repetitions actually transmitted by the UE.

In some aspects, since uplink transmission may be based on resource blocks that are interleaved in a single-carrier/frequency division multiple access (SC-FDMA) scheme, dRS may occupy an entire symbol. In some aspects, the UE may puncture the symbols in the first subframe where dRS is located. In other aspects, the UE may rate match around the dRS.

Thus, the UE may attempt to transmit the five repetitions of the uplink information (e.g., the first uplink transmission) during the five subframes of the first TxOP starting at subframe 512 and proceeding through subframes 514, 516, 518, and 520. The UE, however, may perform an unsuccessful LBT procedure during the subframe 512 and the uplink transmission may fail during that subframe. The UE may perform another unsuccessful LBT procedure during the subframe 514. The UE may perform a successful LBT procedure during the subframe 516 and begin the uplink transmission during that subframe. The UE may transmit the dRS during the subframe 516 along with the uplink data. The UE may continue transmitting the first uplink transmission during subframes 518 and 520 of the first TxOP.

During the second TxOP, the base station may transmit a trigger during subframe 524 to initiate the uplink transmission. The UE may attempt to transmit the seven repetitions of the uplink data (e.g., the second uplink transmission) during the seven subframes of the second TxOP starting at subframe 528 and proceeding through subframes 530, 532, 534, 536, 538, and 540. However, a LBT procedure during subframe 528 may also fail, preventing the uplink transmission during that subframe. The LBT procedure during subframe 530, however, may be successful and the UE may perform the second uplink transmission during the subframes 530, 532, 534, 536, 538, and 540. The UE may transmit the dRS during the subframe 530 to signal the start of the uplink transmission during the second TxOP.

Figure 6:
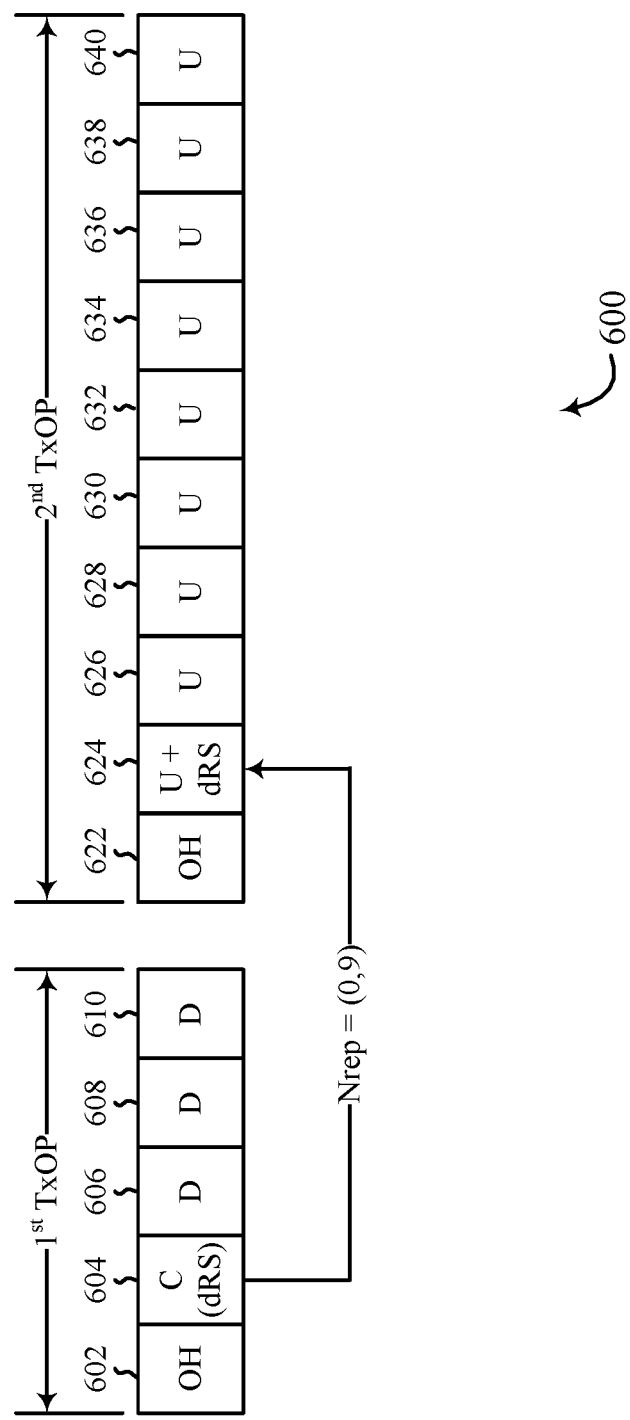
FIG. 6 illustrates an example of a uplink configuration that supports PUSCH coverage enhancements in accordance with aspects of the present disclosure.

FIG. 6 illustrates an example of a PUSCH configuration 600 that supports PUSCH coverage enhancements in accordance with various aspects of the present disclosure. PUSCH configuration 600 may implement aspect(s) of wireless communication system 100 and/or process 200 described above. PUSCH configuration 600 may implement aspects of PUSCH configurations 300, 400 and/or 500 described herein. Aspects of PUSCH configuration 600 may be implemented by a UE and/or a base station, which may be examples of the corresponding devices described herein.

Generally, PUSCH configuration 600 illustrates an example of two TxOPs, e.g., a first TxOP and a second TxOP. Each TxOP includes a number of subframes. In the example PUSCH configuration 600, the first TxOP includes subframes 602, 604, 606, 608, and 610, e.g., five subframes. In the example PUSCH configuration 600, the second TxOP includes subframes 622, 624, 626, 628, 630, 632, 634, 636, 638, and 640, e.g., ten subframes. It is to be understood that the first and second TxOPs are not limited to ten subframes, respectively, and that either TxOP may have more or less subframes. As is discussed above, each TxOP may have different subframe types. Moreover, each TxOP may have a different number of subframes, a different collection of subframe types and/or, for each subframe type, a different number of subframes.

The UE and base station may use PUSCH configuration 600 to perform aspects of the described techniques for PUSCH coverage enhancements. For example, the base station may transmit an uplink grant in subframe 604 of the first TxOP. The uplink grant may include the indication of the multi-TxOP grant and, in some examples, the repetition indicator, and the TBS factor, as is discussed herein. The uplink grant may also carry or otherwise convey an indication of a dRS to the UE. The dRS indication may be used by the UE for transmission of dRS signals. In the example PUSCH configuration 600, the repetition factor may be 0, 9, which indicates that the UE is to transmit no repetitions of the uplink data in the first TxOP and nine repetitions of the uplink data in the second TxOP.

Aspect(s) of the PUSCH configuration 600 provide for scheduling PUSCH transmissions outside of the base station acquired TxOP. For example and to enable contiguous uplink transmissions from the UE (and to simply the UE procedures), the base station may schedule UE uplink transmissions outside its TxOP. The base station may, in the uplink grant, configure a window during which the UE should start the uplink transmissions. This may allow the UE to transmit a reservation signal to improve the probability of medium access. The UE may transmit a dRS, which may allow the base station to detect the start of UE uplink transmission. In some aspects, if the UE cannot transmit the uplink transmissions during the window, the uplink grant may be forfeited by the UE.

Thus, during the second TxOP, the UE may attempt to transmit the nine repetitions of the uplink data (e.g., the first and second uplink transmissions) during the nine subframes of the second TxOP starting at subframe 624 and proceeding through subframes 626, 628, 630, 632, 634, 636, 638, and 640. For example, the LBT procedure during subframe 624 may be successful and the UE may perform the first and second uplink transmissions during these subframes. The UE may transmit the dRS during the subframe 624 to signal the start of the uplink transmission during the second TxOP.

Figure 7:
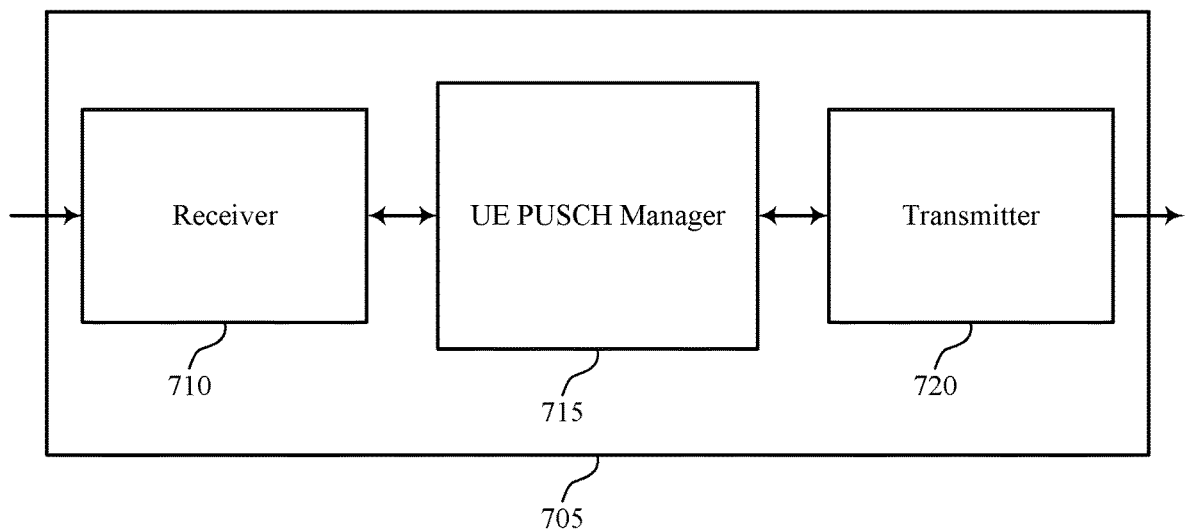
FIGS. 7 through 9 show block diagrams of a device that supports PUSCH coverage enhancements in accordance with aspects of the present disclosure.

FIG. 7 shows a block diagram 700 of a wireless device 705 that supports PUSCH coverage enhancements in accordance with various aspects of the present disclosure. Wireless device 705 may be an example of aspects of a UE 115 as described with reference to FIG. 1, wireless device 705 may include a receiver 710, a UE PUSCH manager 715, and a transmitter 720, wireless device 705 may also include a processor. Each of these components may be in communication with one another (e.g., via one or more buses).

Receiver 710 may receive information such as packets, user data, or control information associated with various information channels (e.g., control channels, data channels, and information related to PUSCH coverage enhancements, etc.). Information may be passed on to other components of the device. The receiver 710 may be an example of aspects of the transceiver 1035 described with reference to FIG. 10.

UE PUSCH manager 715 may be an example of aspects of the UE PUSCH manager 1015 described with reference to FIG. 10.

UE PUSCH manager 715 and/or at least some of its various sub-components may be implemented in hardware, software executed by a processor, firmware, or any combination thereof. If implemented in software executed by a processor, the functions of the UE PUSCH manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE PUSCH manager 715 and/or at least some of its various sub-components may be physically located at various positions, including being distributed such that portions of functions are implemented at different physical locations by one or more physical devices. In some examples, UE PUSCH manager 715 and/or at least some of its various sub-components may be a separate and distinct component in accordance with various aspects of the present disclosure. In other examples, UE PUSCH manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE PUSCH manager 715 may receive an uplink grant that conveys an indication of a multi-TxOP grant. UE PUSCH manager 715 may transmit, during a first TxOP, a first uplink transmission in one or more subframes in accordance with the multi-TxOP grant. UE PUSCH manager 715 may transmit, during a second TxOP, a second uplink transmission in one or more subframes in accordance with the uplink grant.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
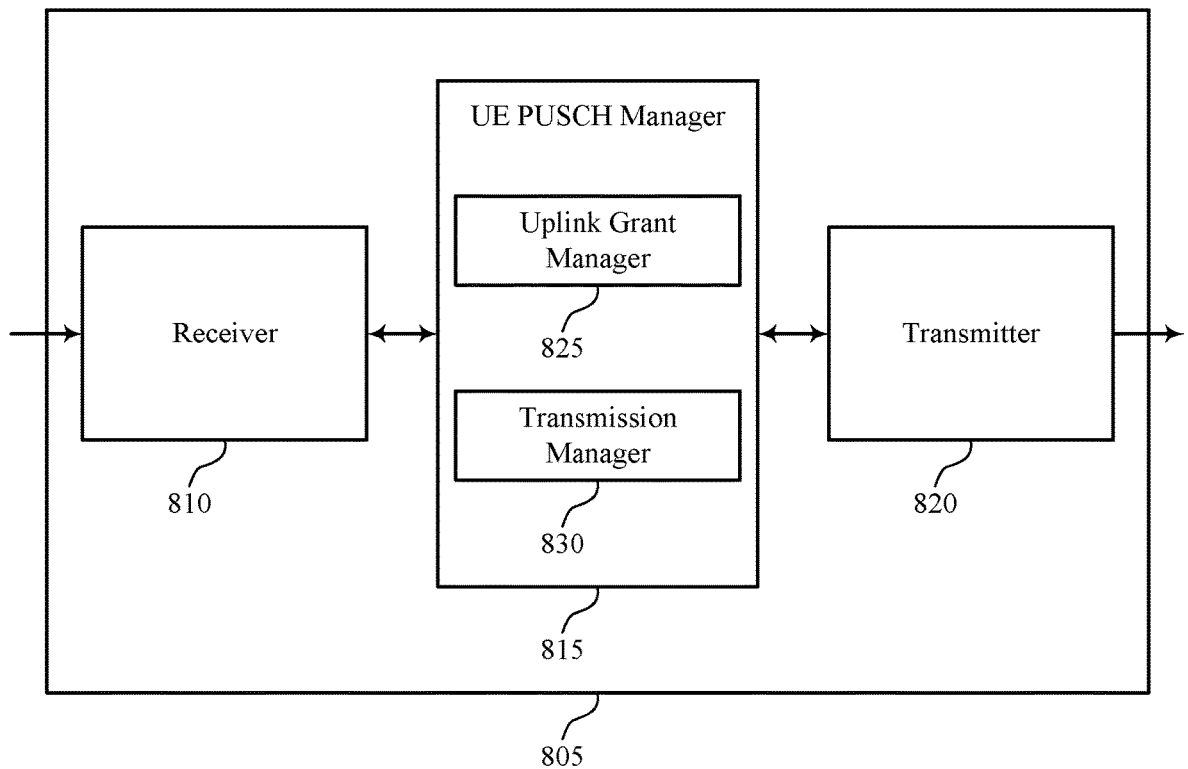

FIG. 8 shows a block diagram 800 of a wireless device 805 that supports PUSCH coverage enhancements in accordance with various aspects of the present disclosure. Wireless device 805 may be an example of aspects of a wireless device 705 or a UE 115 as described with reference to FIGS. 1 and 7, wireless device 805 may include receiver 810, UE PUSCH manager 815, and transmitter 820, wireless device 805 may also include a processor. Each of these components may be in communication with one another (e.g., via one or more buses).

Receiver 810 may receive information such as packets, user data, or control information associated with various information channels (e.g., control channels, data channels, and information related to PUSCH coverage enhancements, etc.). Information may be passed on to other components of the device. The receiver 810 may be an example of aspects of the transceiver 1035 described with reference to FIG. 10.

UE PUSCH manager 815 may be an example of aspects of the UE PUSCH manager 1015 described with reference to FIG. 10. UE PUSCH manager 815 may also include uplink grant manager 825 and transmission manager 830.

Uplink grant manager 825 may receive an uplink grant that conveys an indication of a multi-TxOP grant.

Transmission manager 830 may transmit, during a first TxOP, a first uplink transmission in one or more subframes in accordance with the multi-TxOP grant. Transmission manager 830 may transmit, during a second TxOP, a second uplink transmission in one or more subframes in accordance with the multi-TxOP grant. In some cases, the first TxOP and the second TxOP are the same, and where the uplink grant is received in a TxOP other than the first or second TxOPs. In some cases, the first TxOP and the second TxOP are different, and where the uplink grant is received in the first TxOP. In some cases, the first TxOP includes a base station acquired TxOP and the second TxOP include a UE acquired TxOP.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
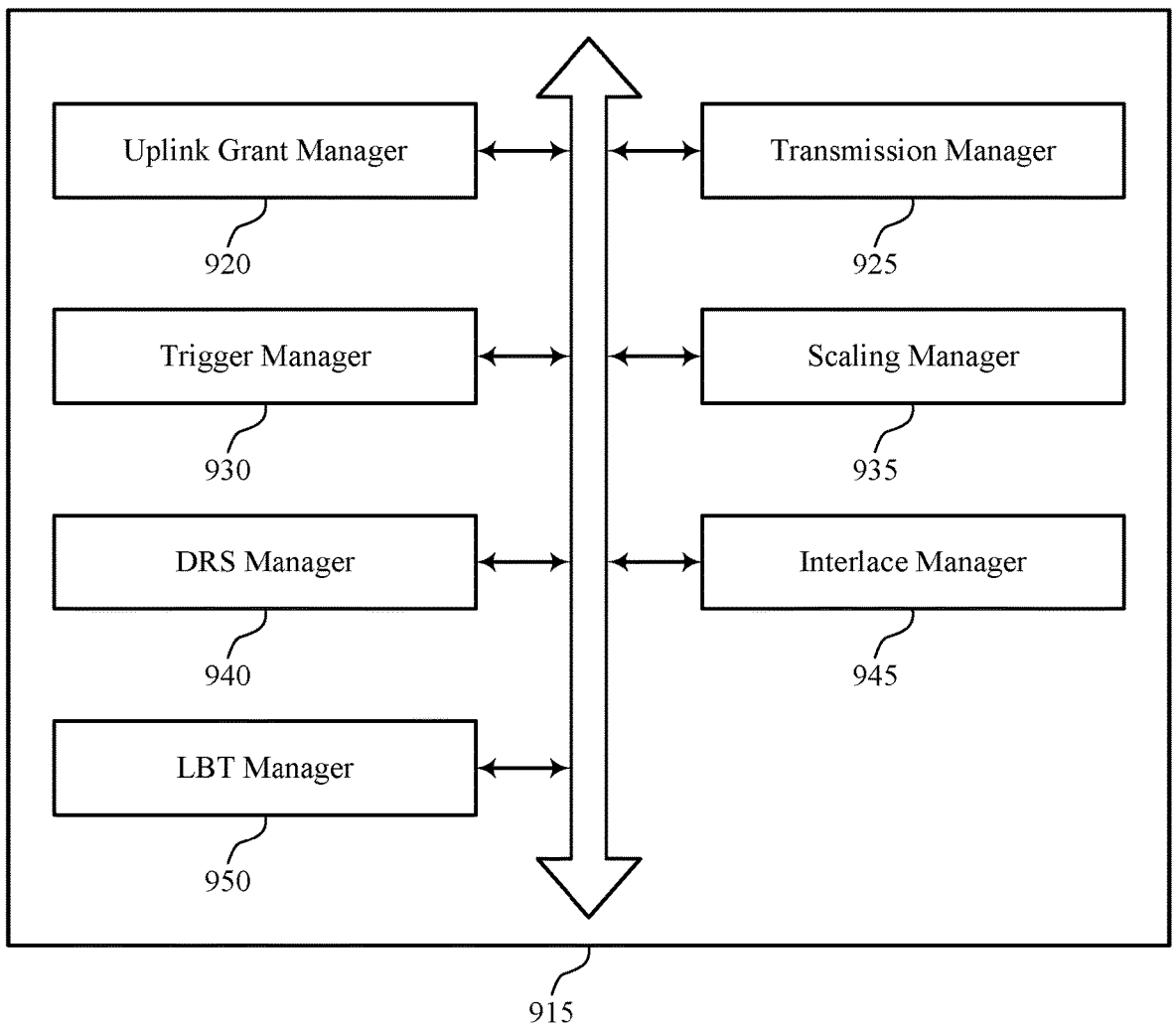

FIG. 9 shows a block diagram 900 of a UE PUSCH manager 915 that supports PUSCH coverage enhancements in accordance with various aspects of the present disclosure. The UE PUSCH manager 915 may be an example of aspects of a UE PUSCH manager 715, a UE PUSCH manager 815, or a UE PUSCH manager 1015 described with reference to FIGS. 7, 8, and 10. The UE PUSCH manager 915 may include uplink grant manager 920, transmission manager 925, trigger manager 930, scaling manager 935, dRS manager 940, interlace manager 945, and LBT manager 950. Each of these modules may communicate, directly or indirectly, with one another (e.g., via one or more buses).

Uplink grant manager 920 may receive an uplink grant that conveys an indication of a multi-TxOP grant.

Transmission manager 925 may transmit, during a first TxOP, a first uplink transmission in one or more subframes in accordance with the multi-TxOP grant. Transmission manager 925 may transmit, during a second TxOP, a second uplink transmission in one or more subframes in accordance with the multi-TxOP grant. In some cases, the first TxOP and the second TxOP are the same, and where the uplink grant is received in a TxOP other than the first or second TxOPs. In some cases, the first TxOP and the second TxOP are different, and where the uplink grant is received in the first TxOP. In some cases, the first TxOP includes a base station acquired TxOP and the second TxOP include a UE acquired TxOP.

Trigger manager 930 may receive a trigger indicator in one or both of the first and second TxOPs during a subframe that is before the subframe in which the first or second uplink transmissions are transmitted, the trigger indicator indicating that repetitive uplink transmissions are permitted to be transmitted during the first or second TxOPs.

Scaling manager 935 may scale one or more transport block sizes prior to transmitting the first and second uplink transmissions, the scaling performed according to the transport block scaling factor.

DRS manager 940 may transmit a dense reference signal during a first uplink subframe of one or both of the first and second TxOPs.

Interlace manager 945 may identify an interlace factor associated with the first and second uplink transmissions and interlace the first and second uplink transmissions according to the interlace factor.

LBT manager 950 may perform a LBT procedure before transmitting the first and second uplink transmissions. LBT manager 950 may determine that a predetermined number of LBT procedures associated with the first or second uplink transmissions have failed, and discard the multi-TxOP uplink grant. In some cases, the predetermined number of LBT procedure failures is based on the repetition indicator.

Figure 10:
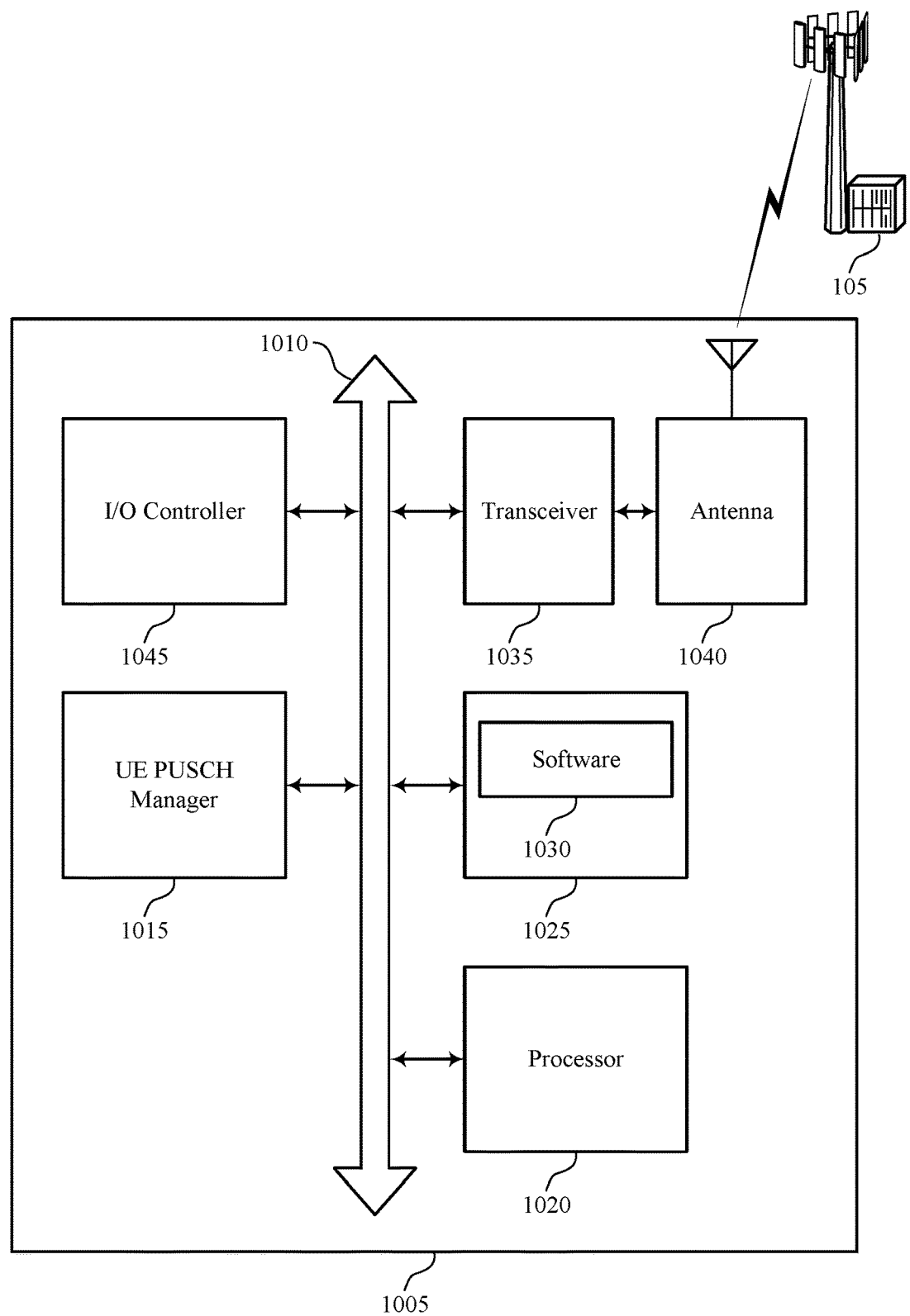
FIG. 10 illustrates a block diagram of a system including a UE that supports PUSCH coverage enhancements in accordance with aspects of the present disclosure.

FIG. 10 shows a diagram of a system 1000 including a device 1005 that supports PUSCH coverage enhancements in accordance with various aspects of the present disclosure. Device 1005 may be an example of or include the components of wireless device 705, wireless device 805, or a UE 115 as described above, e.g., with reference to FIGS. 1 through 8. Device 1005 may include components for bi-directional voice and data communications including components for transmitting and receiving communications, including a UE PUSCH manager 1015, a processor 1020, a memory 1025, a software 1030, a transceiver 1035, an antenna 1040, and an I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting PUSCH coverage enhancements).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support PUSCH coverage enhancements. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
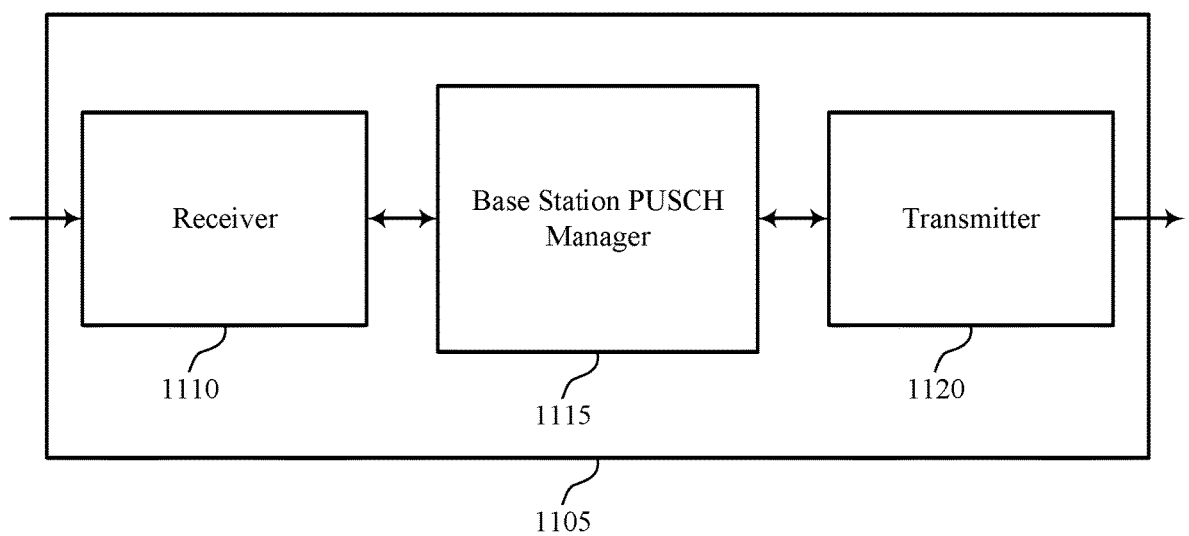
FIGS. 11 through 13 show block diagrams of a device that supports PUSCH coverage enhancements in accordance with aspects of the present disclosure.

FIG. 11 shows a block diagram 1100 of a wireless device 1105 that supports PUSCH coverage enhancements in accordance with various aspects of the present disclosure. Wireless device 1105 may be an example of aspects of a base station 105 as described with reference to FIGS. 1 through 6. Wireless device 1105 may include a receiver 1110, a base station PUSCH manager 1115, and a transmitter 1120, wireless device 1105 may also include a processor. Each of these components may be in communication with one another (e.g., via one or more buses).

Receiver 1110 may receive information such as packets, user data, or control information associated with various information channels (e.g., control channels, data channels, and information related to PUSCH coverage enhancements, etc.). Information may be passed on to other components of the device. The receiver 1110 may be an example of aspects of the transceiver 1435 described with reference to FIG. 14.

Base station PUSCH manager 1115 may be an example of aspects of the base station PUSCH manager 1415 described with reference to FIG. 14.

Base station PUSCH manager 1115 and/or at least some of its various sub-components may be implemented in hardware, software executed by a processor, firmware, or any combination thereof. If implemented in software executed by a processor, the functions of the base station PUSCH manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station PUSCH manager 1115 and/or at least some of its various sub-components may be physically located at various positions, including being distributed such that portions of functions are implemented at different physical locations by one or more physical devices. In some examples, base station PUSCH manager 1115 and/or at least some of its various sub-components may be a separate and distinct component in accordance with various aspects of the present disclosure. In other examples, base station PUSCH manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station PUSCH manager 1115 may transmit an uplink grant that conveys an indication of a multi-TxOP grant. Base station PUSCH manager 1115 may receive, during a first TxOP, a first uplink transmission in one or more subframes in accordance with the multi-TxOP grant. Base station PUSCH manager 1115 may receive, during a second TxOP, a second uplink transmission in one or more subframes in accordance with the multi-TxOP grant.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
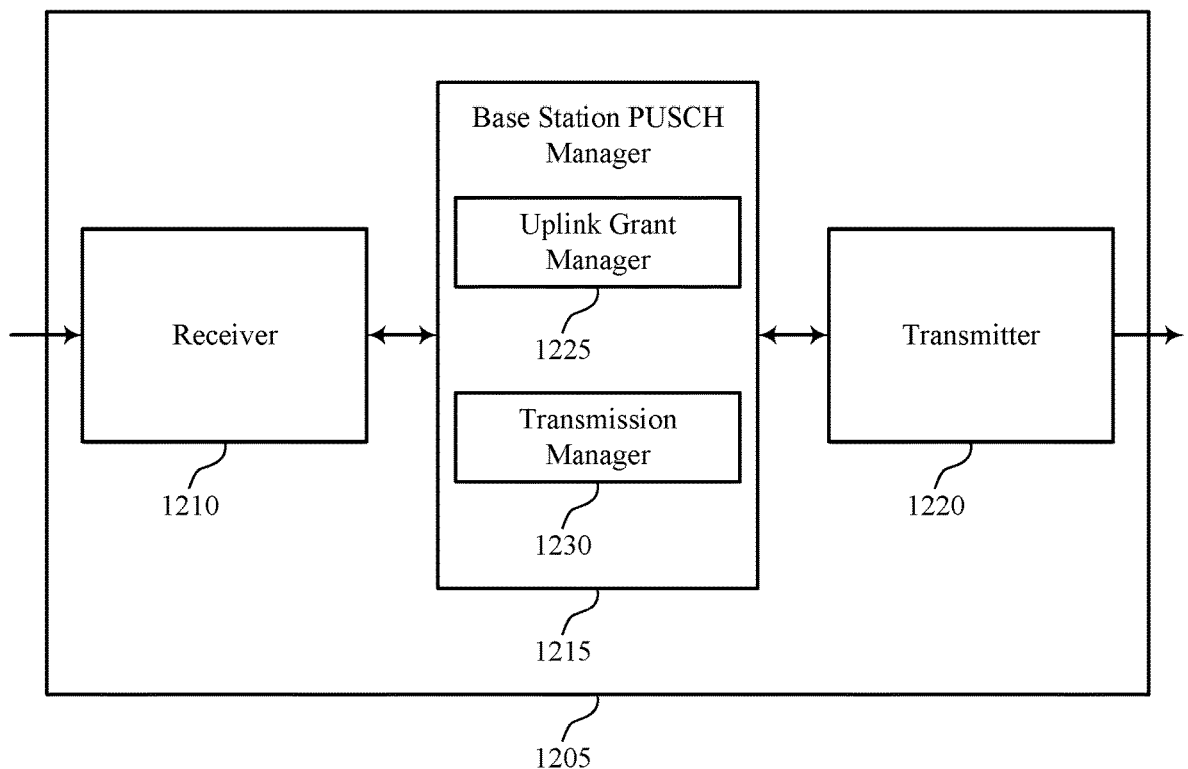

FIG. 12 shows a block diagram 1200 of a wireless device 1205 that supports PUSCH coverage enhancements in accordance with various aspects of the present disclosure. Wireless device 1205 may be an example of aspects of a wireless device 1105 or a base station 105 as described with reference to FIGS. 1 through 6 and 11, wireless device 1205 may include a receiver 1210, a base station PUSCH manager 1215, and a transmitter 1220, wireless device 1205 may also include a processor. Each of these components may be in communication with one another (e.g., via one or more buses).

Receiver 1210 may receive information such as packets, user data, or control information associated with various information channels (e.g., control channels, data channels, and information related to PUSCH coverage enhancements, etc.). Information may be passed on to other components of the device. The receiver 1210 may be an example of aspects of the transceiver 1435 described with reference to FIG. 14.

Base station PUSCH manager 1215 may be an example of aspects of the base station PUSCH manager 1415 described with reference to FIG. 14. Base station PUSCH manager 1215 may also include an uplink grant manager 1225 and a transmission manager 1230.

Uplink grant manager 1225 may transmit an uplink grant that conveys an indication of a multi-TxOP grant.

Transmission manager 1230 may receive, during a first TxOP, a first uplink transmission in one or more subframes in accordance with the multi-TxOP grant. Transmission manager 1230 may receive, during a second TxOP, a second uplink transmission in one or more subframes in accordance with the multi-TxOP grant. In some cases, the first TxOP and the second TxOP are the same, and where the uplink grant is received in a TxOP other than the first or second TxOPs. In some cases, the first TxOP and the second TxOP are different, and where the uplink grant is received in the first TxOP. In some cases, the first TxOP includes a base station acquired TxOP and the second TxOP include a UE acquired TxOP.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
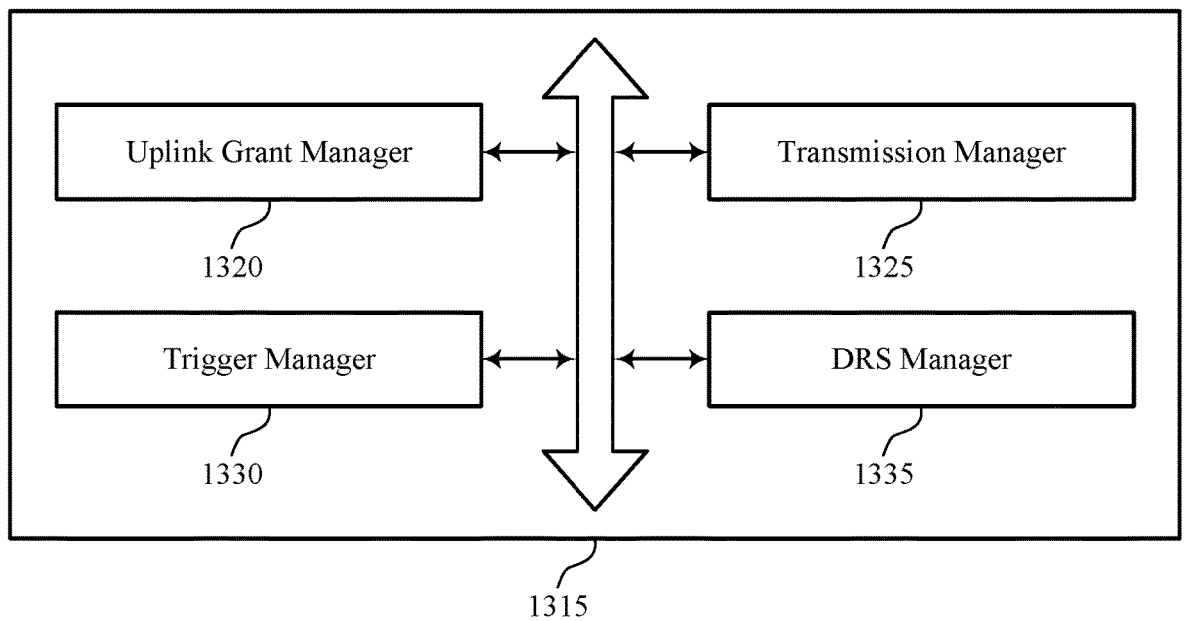

FIG. 13 shows a block diagram 1300 of a base station PUSCH manager 1315 that supports PUSCH coverage enhancements in accordance with various aspects of the present disclosure. The base station PUSCH manager 1315 may be an example of aspects of a base station PUSCH manager 1415 described with reference to FIGS. 11, 12, and 14. The base station PUSCH manager 1315 may include an uplink grant manager 1320, a transmission manager 1325, a trigger manager 1330, and a dRS manager 1335. Each of these modules may communicate, directly or indirectly, with one another (e.g., via one or more buses).

Uplink grant manager 1320 may transmit an uplink grant that conveys an indication of a multi-TxOP grant.

Transmission manager 1325 may receive, during a first TxOP, a first uplink transmission in one or more subframes in accordance with the multi-TxOP grant. Transmission manager 1325 may receive, during a second TxOP, a second uplink transmission in one or more subframes in accordance with the multi-TxOP grant. In some cases, the first TxOP and the second TxOP are the same, and where the uplink grant is received in a TxOP other than the first or second TxOPs. In some cases, the first TxOP and the second TxOP are different, and where the uplink grant is received in the first TxOP. In some cases, the first TxOP includes a base station acquired TxOP and the second TxOP include a UE acquired TxOP.

Trigger manager 1330 may transmit a trigger indicator in at least one of the first or second TxOPs during a subframe that is before the subframe in which the first or second uplink transmissions are received, the trigger indicator indicating that repetitive uplink transmissions are permitted to be transmitted during the first or second TxOPs.

DRS manager 1335 may receive a dense reference signal during a first uplink subframe of one or both of the first and second TxOPs.

Figure 14:
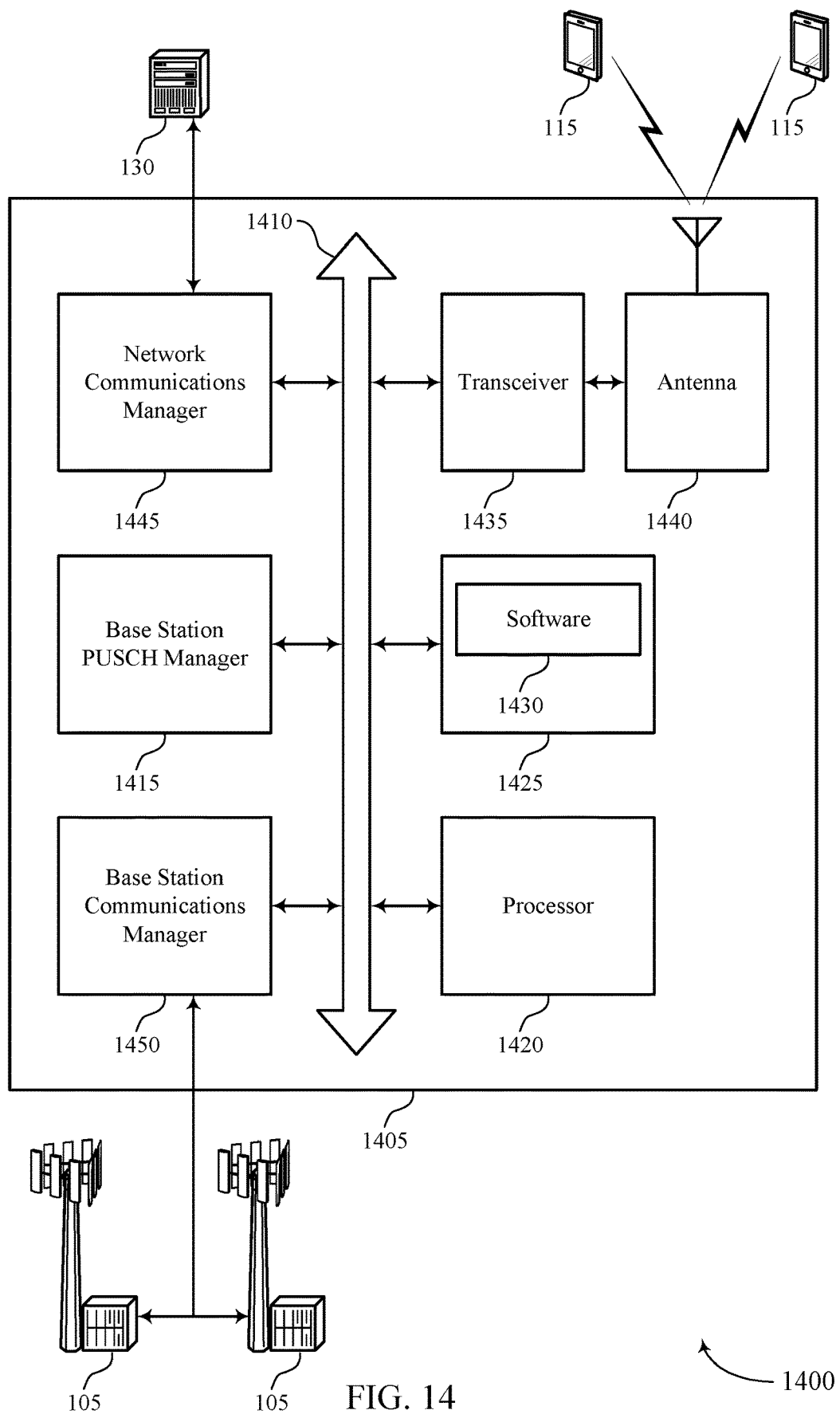
FIG. 14 illustrates a block diagram of a system including a base station that supports PUSCH coverage enhancements in accordance with aspects of the present disclosure.

FIG. 14 shows a diagram of a system 1400 including a device 1405 that supports PUSCH coverage enhancements in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including a base station PUSCH manager 1415, a processor 1420, a memory 1425, a software 1430, a transceiver 1435, an antenna 1440, a network communications manager 1445, and a base station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting PUSCH coverage enhancements).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support PUSCH coverage enhancements. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
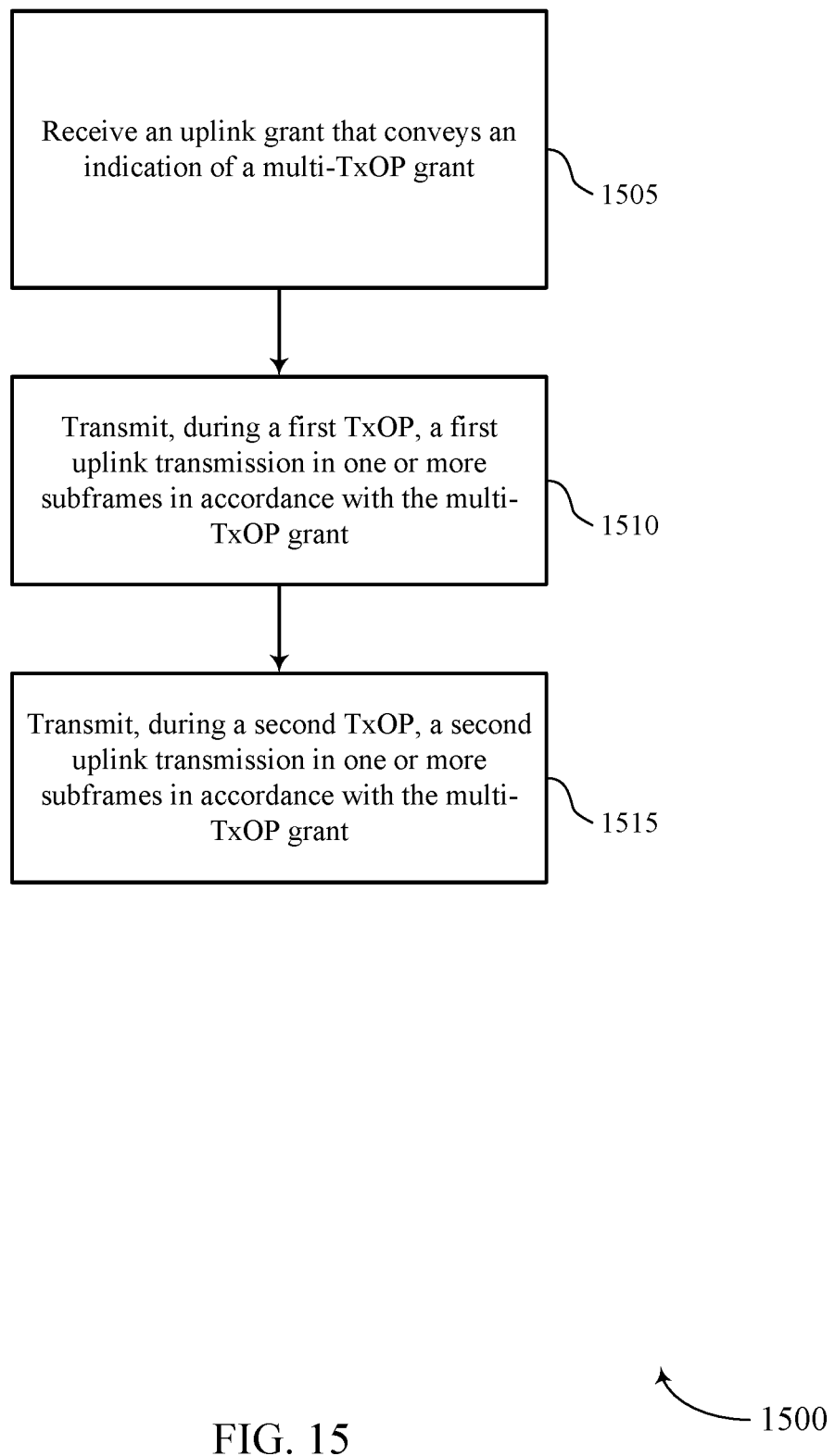
FIGS. 15 through 18 illustrate methods for PUSCH coverage enhancements in accordance with aspects of the present disclosure.

FIG. 15 shows a flowchart illustrating a method 1500 for PUSCH coverage enhancements in accordance with various aspects of the present disclosure. The operations of method 1500 may be implemented by a UE 115 or its components as described herein. For example, the operations of method 1500 may be performed by a UE PUSCH manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive an uplink grant that conveys an indication of a multi-TxOP grant. The operations of block 1505 may be performed according to the methods described with reference to FIGS. 1 through 6. In certain examples, aspects of the operations of block 1505 may be performed by a uplink grant manager as described with reference to FIGS. 7 through 10.

At block 1510 the UE 115 may transmit, during a first TxOP, a first uplink transmission in one or more subframes in accordance with the multi-TxOP grant. The operations of block 1510 may be performed according to the methods described with reference to FIGS. 1 through 6. In certain examples, aspects of the operations of block 1510 may be performed by a transmission manager as described with reference to FIGS. 7 through 10.

At block 1515 the UE 115 may transmit, during a second TxOP, a second uplink transmission in one or more subframes in accordance with the uplink grant. The operations of block 1515 may be performed according to the methods described with reference to FIGS. 1 through 6. In certain examples, aspects of the operations of block 1515 may be performed by a transmission manager as described with reference to FIGS. 7 through 10.

Figure 16:
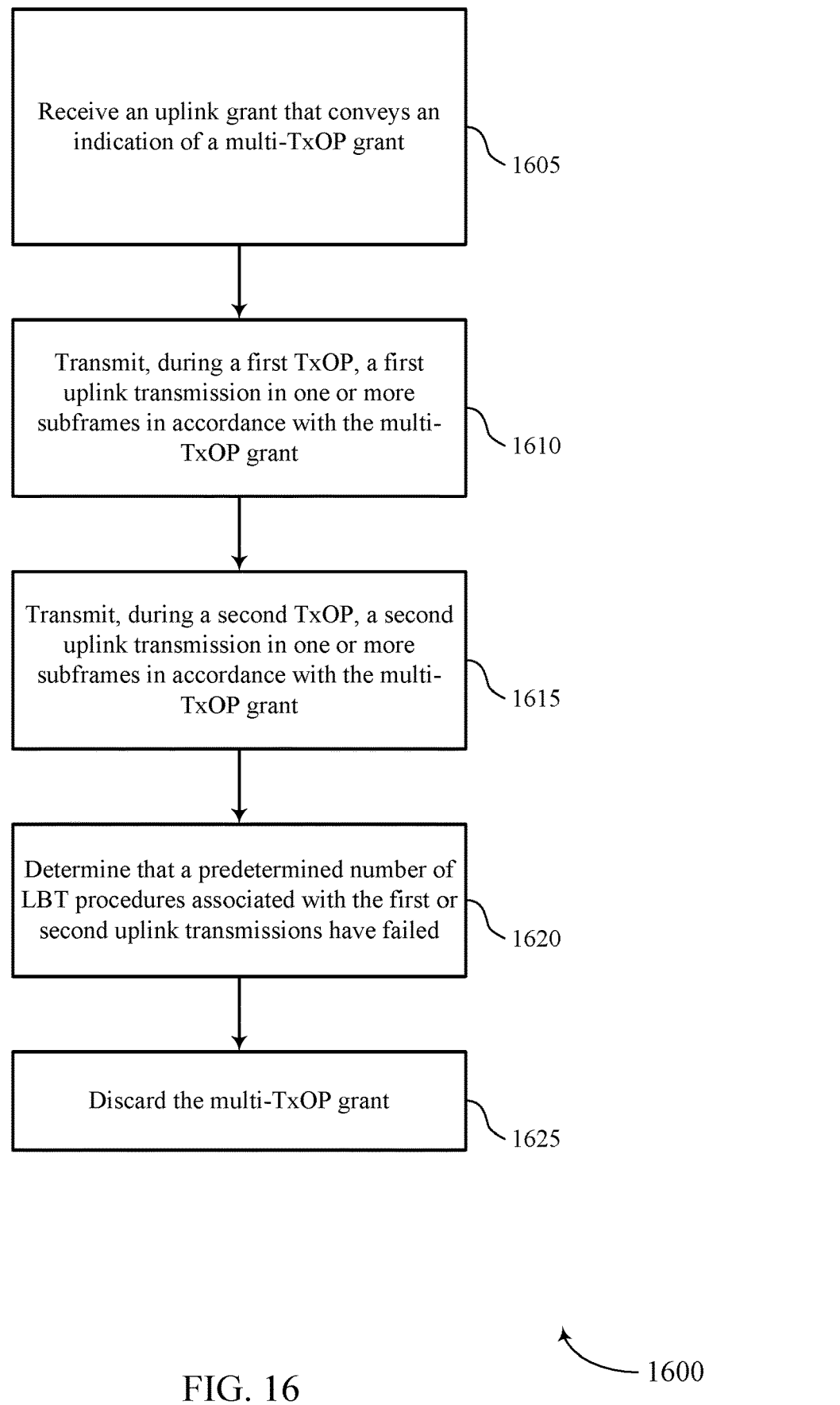

FIG. 16 shows a flowchart illustrating a method 1600 for PUSCH coverage enhancements in accordance with various aspects of the present disclosure. The operations of method 1600 may be implemented by a UE 115 or its components as described herein. For example, the operations of method 1600 may be performed by a UE PUSCH manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive an uplink grant that conveys an indication of a multi-TxOP grant. The operations of block 1605 may be performed according to the methods described with reference to FIGS. 1 through 6. In certain examples, aspects of the operations of block 1605 may be performed by a uplink grant manager as described with reference to FIGS. 7 through 10.

At block 1610 the UE 115 may transmit, during a first TxOP, a first uplink transmission in one or more subframes in accordance with the multi-TxOP grant. The operations of block 1610 may be performed according to the methods described with reference to FIGS. 1 through 6. In certain examples, aspects of the operations of block 1610 may be performed by a transmission manager as described with reference to FIGS. 7 through 10.

At block 1615 the UE 115 may transmit, during a second TxOP, a second uplink transmission in one or more subframes in accordance with the multi-TxOP grant. The operations of block 1615 may be performed according to the methods described with reference to FIGS. 1 through 6. In certain examples, aspects of the operations of block 1615 may be performed by a transmission manager as described with reference to FIGS. 7 through 10.

At block 1620 the UE 115 may determine that a predetermined number of LBT procedures associated with the first or second uplink transmissions have failed. The operations of block 1620 may be performed according to the methods described with reference to FIGS. 1 through 6. In certain examples, aspects of the operations of block 1620 may be performed by a LBT manager as described with reference to FIGS. 7 through 10.

At block 1625 the UE 115 may discard the multi-TxOP grant. The operations of block 1625 may be performed according to the methods described with reference to FIGS. 1 through 6. In certain examples, aspects of the operations of block 1625 may be performed by a LBT manager as described with reference to FIGS. 7 through 10.

Figure 17:
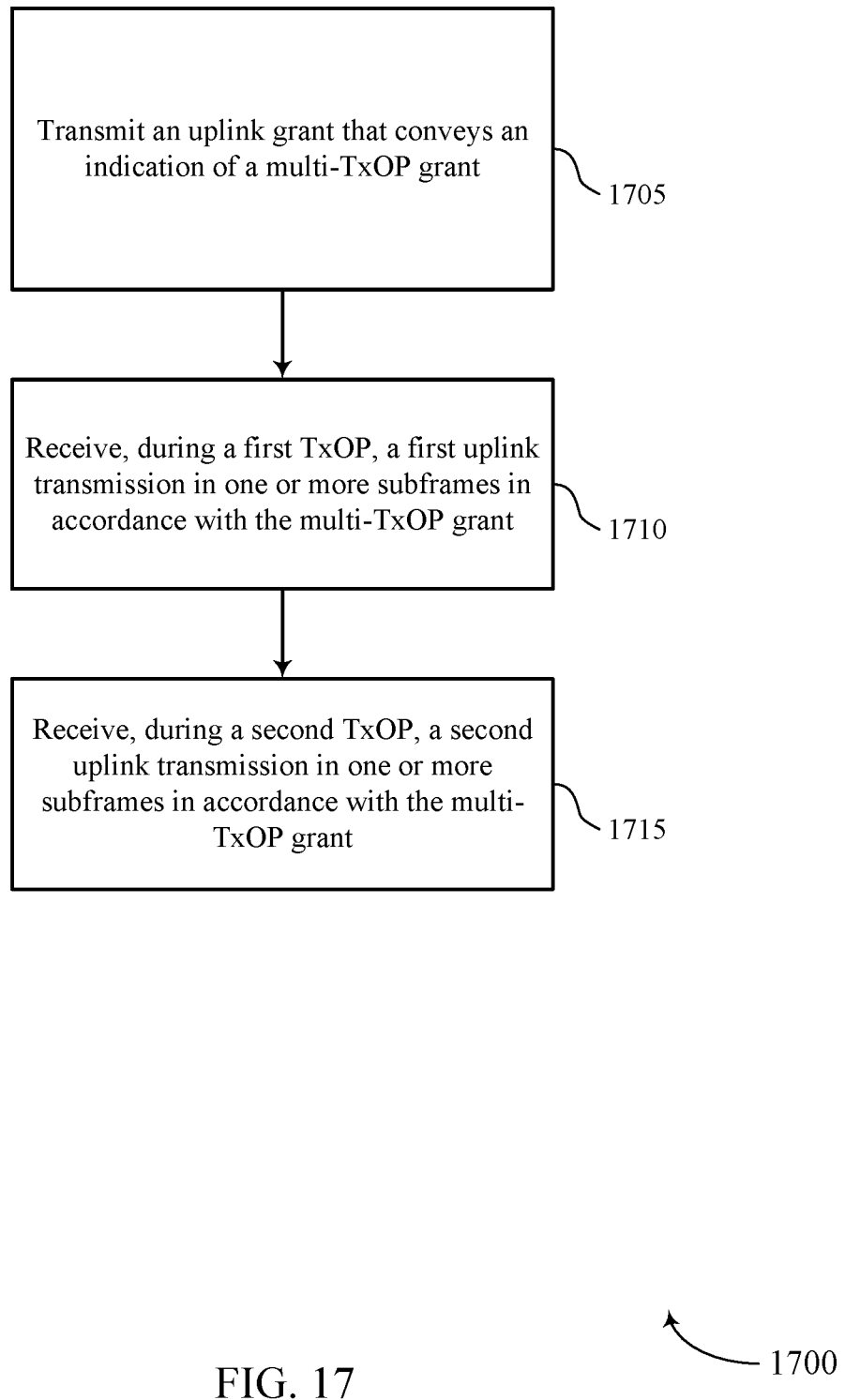

FIG. 17 shows a flowchart illustrating a method 1700 for PUSCH coverage enhancements in accordance with various aspects of the present disclosure. The operations of method 1700 may be implemented by a base station 105 or its components as described herein. For example, the operations of method 1700 may be performed by a base station PUSCH manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may transmit an uplink grant that conveys an indication of a multi-TxOP grant. The operations of block 1705 may be performed according to the methods described with reference to FIGS. 1 through 6. In certain examples, aspects of the operations of block 1705 may be performed by a uplink grant manager as described with reference to FIGS. 11 through 14.

At block 1710 the base station 105 may receive, during a first TxOP, a first uplink transmission in one or more subframes in accordance with the multi-TxOP grant. The operations of block 1710 may be performed according to the methods described with reference to FIGS. 1 through 6. In certain examples, aspects of the operations of block 1710 may be performed by a transmission manager as described with reference to FIGS. 11 through 14.

At block 1715 the base station 105 may receive, during a second TxOP, a second uplink transmission in one or more subframes in accordance with the multi-TxOP grant. The operations of block 1715 may be performed according to the methods described with reference to FIGS. 1 through 6. In certain examples, aspects of the operations of block 1715 may be performed by a transmission manager as described with reference to FIGS. 11 through 14.

Figure 18:
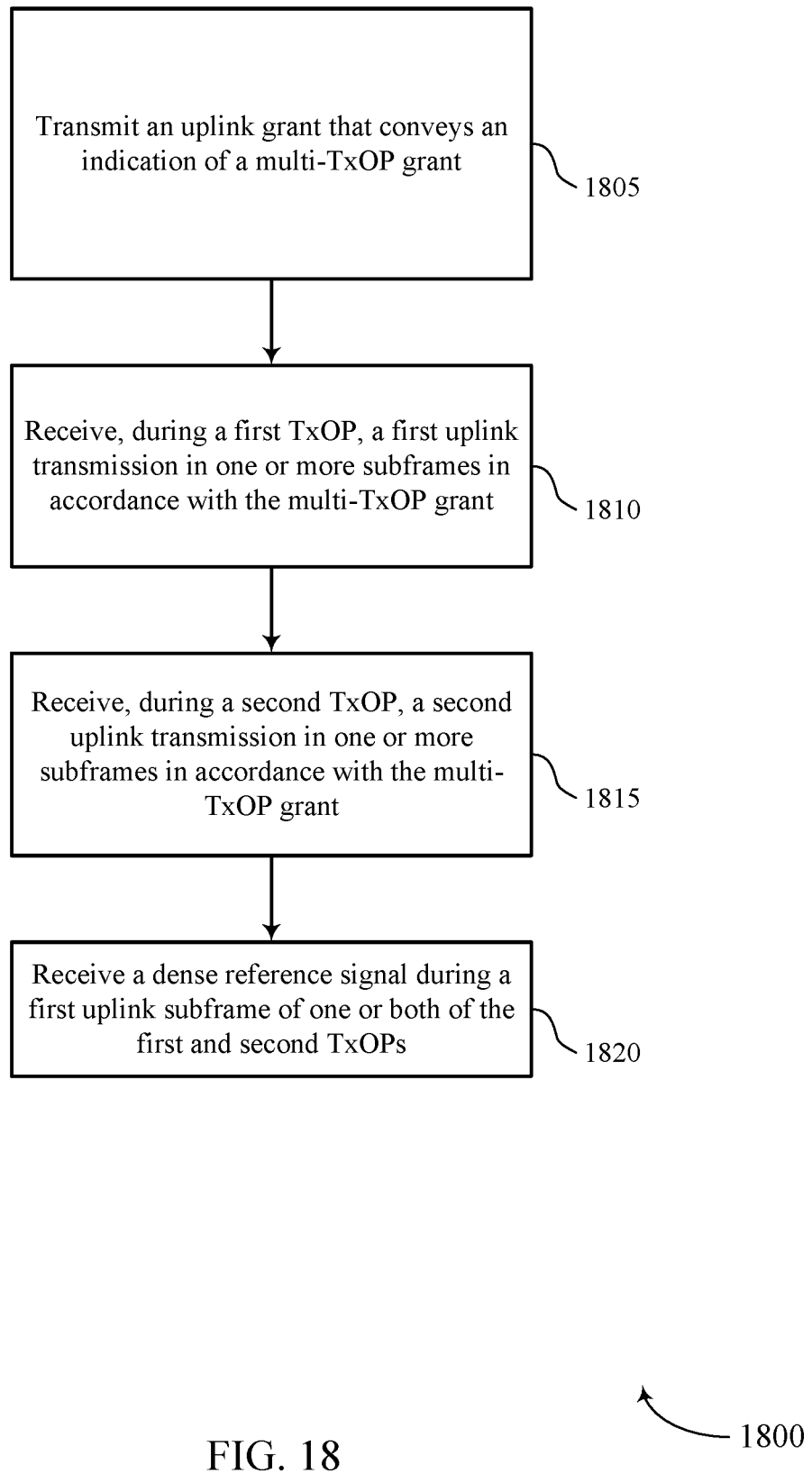

FIG. 18 shows a flowchart illustrating a method 1800 for PUSCH coverage enhancements in accordance with various aspects of the present disclosure. The operations of method 1800 may be implemented by a base station 105 or its components as described herein. For example, the operations of method 1800 may be performed by a base station PUSCH manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit an uplink grant that conveys an indication of a multi-TxOP grant. The operations of block 1805 may be performed according to the methods described with reference to FIGS. 1 through 6. In certain examples, aspects of the operations of block 1805 may be performed by a uplink grant manager as described with reference to FIGS. 11 through 14.

At block 1810 the base station 105 may receive, during a first TxOP, a first uplink transmission in one or more subframes in accordance with the multi-TxOP grant. The operations of block 1810 may be performed according to the methods described with reference to FIGS. 1 through 6. In certain examples, aspects of the operations of block 1810 may be performed by a transmission manager as described with reference to FIGS. 11 through 14.

At block 1815 the base station 105 may receive, during a second TxOP, a second uplink transmission in one or more subframes in accordance with the multi-TxOP grant. The operations of block 1815 may be performed according to the methods described with reference to FIGS. 1 through 6. In certain examples, aspects of the operations of block 1815 may be performed by a transmission manager as described with reference to FIGS. 11 through 14.

At block 1820 the base station 105 may receive a dense reference signal during a first uplink subframe of one or both of the first and second TxOPs. The operations of block 1820 may be performed according to the methods described with reference to FIGS. 1 through 6. In certain examples, aspects of the operations of block 1820 may be performed by a dRS manager as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving an uplink grant that conveys an indication of a multi-transmission opportunity (TxOP) grant and a transport block scaling factor;
   transmitting, during a first TxOP, a first uplink transmission in one or more subframes in accordance with the multi-TxOP grant and the transport block scaling factor, wherein the first uplink transmission comprises a dense reference signal based at least in part on capturing a medium for one or more repetitions of uplink data in the first uplink transmission in the first TxOP, and wherein the dense reference signal identifies the beginning of a first repetition of the uplink data in the uplink transmission during the first TxOP;
   transmitting, during a second TxOP different from the first TxOP, a second uplink transmission in one or more subframes in accordance with the multi-TxOP grant and the transport block scaling factor; and
   receiving a trigger indicator in the second TxOP during a subframe that is before the subframe in which the first or second uplink transmissions are transmitted, the trigger indicator indicating that repetitions of the uplink data are permitted to be transmitted during the second TxOP.

2. The method of claim 1, further comprising:
   receiving the trigger indicator in the first TxOP during a subframe that is before the subframe in which the first or second uplink transmissions are transmitted, the trigger indicator indicating that repetitions of the uplink data are permitted to be transmitted during the first TxOP.

3. The method of claim 1, wherein the trigger indicator comprises at least one of an on/off indication or a sequence number for the trigger indicator using one or more bits of the trigger indicator.

4. The method of claim 3, further comprising:
   monitoring a configured set of bits in a common control signaling to determine the sequence number for the trigger indicator.

5. The method of claim 3, wherein the one or more bits of the trigger indicator are based at least in part on a resource identifier indicated in a downlink control indicator (DCI).

6. The method of claim 1, further comprising:
   scaling one or more transport block sizes prior to transmitting the first and second uplink transmissions, the scaling performed according to the transport block scaling factor.

7. The method of claim 1, further comprising:
   transmitting the dense reference signal during a first uplink subframe of the first TxOP; and
   transmitting a second dense reference signal during a first uplink subframe of the second TxOP.

8. The method of claim 1, further comprising:
   identifying an interlace factor associated with the first and second uplink transmissions; and
   interlacing the first and second uplink transmissions according to the interlace factor.

9. The method of claim 1, further comprising:
   performing a listen-before-talk (LBT) procedure before transmitting the first and second uplink transmissions.

10. The method of claim 1, further comprising:
    determining that a predetermined number of listen-before-talk (LBT) procedures associated with the first or second uplink transmissions have failed; and
    discarding the multi-TxOP grant.

11. The method of claim 10, wherein:
    the predetermined number of LBT procedure failures is based at least in part on a repetition indicator.

12. The method of claim 1, wherein:
    the uplink grant is received in a TxOP other than the first or second TxOPs.

13. The method of claim 1, wherein:
    the uplink grant is received in the first TxOP.

14. The method of claim 1, wherein:
    the first TxOP comprises a base station acquired TxOP and the second TxOP comprise a user equipment (UE) acquired TxOP.

15. The method of claim 1, wherein:
    the uplink grant further conveys an indication of a repetition indicator.

16. A method for wireless communication, comprising:
    transmitting an uplink grant that conveys an indication of a multi-transmission opportunity (TxOP) grant and a transport block scaling factor;
    receiving, during a first TxOP, a first uplink transmission in one or more subframes in accordance with the multi-TxOP grant and the transport block scaling factor, wherein the first uplink transmission comprises a dense reference signal based at least in part on a medium captured for one or more repetitions of uplink data in the first uplink transmission in the first TxOP, and wherein the dense reference signal identifies the beginning of a first repetition of the uplink data in the uplink transmission during the first TxOP;
    receiving, during a second TxOP different from the first TxOP, a second uplink transmission in one or more subframes in accordance with the multi-TxOP grant and the transport block scaling factor; and transmitting a trigger indicator in the second TxOP during a subframe that is before the subframe in which the first or second uplink transmissions are transmitted, the trigger indicator indicating that repetitions of the uplink data are permitted to be transmitted during the second TxOP.

17. The method of claim 16, further comprising:
transmitting the trigger indicator in the first TxOP during a subframe that is before the subframe in which the first or second uplink transmissions are transmitted, the trigger indicator indicating that repetitions of the uplink data are permitted to be transmitted during the first TxOP.

18. The method of claim 16, further comprising:
receiving the dense reference signal during a first uplink subframe of the first TxOP; and
receiving a second dense reference signal during a first uplink subframe of the second TxOP.

19. The method of claim 16, wherein:
the uplink grant is received in a TxOP other than the first or second TxOPs.

20. The method of claim 16, wherein:
the uplink grant is received in the first TxOP.

21. The method of claim 16, wherein:
the first TxOP comprises a base station acquired TxOP and the second TxOP comprise a user equipment (UE) acquired TxOP.

22. An apparatus for wireless communication, in a system comprising:
a processor;
memory coupled with the processor; and
instructions stored in the memory and operable, when executed by the processor, to cause the apparatus to:
receive an uplink grant that conveys an indication of a multi-transmission opportunity (TxOP) grant and a transport block scaling factor;
transmit, during a first TxOP, a first uplink transmission in one or more subframes in accordance with the multi-TxOP grant and the transport block scaling factor, wherein the first uplink transmission comprises a dense reference signal based at least in part on capturing a medium for one or more repetitions of uplink data in the first uplink transmission in the first TxOP, and wherein the dense reference signal identifies the beginning of a first repetition of the uplink data in the uplink transmission during the first TxOP;
transmit, during a second TxOP different from the first TxOP, a second uplink transmission in one or more subframes in accordance with the multi-TxOP grant and the transport block scaling factor; and
receive a trigger indicator in the second TxOP during a subframe that is before the subframe in which the first or second uplink transmissions are transmitted, the trigger indicator indicating that repetitions of the uplink data are permitted to be transmitted during the second TxOP.

23. The apparatus of claim 22, wherein the instructions are further executable by the processor to:
receive the trigger indicator in the first TxOP during a subframe that is before the subframe in which the first or second uplink transmissions are transmitted, the trigger indicator indicating that repetitions of the uplink data are permitted to be transmitted during the first TxOP.

24. The apparatus of claim 22, wherein the trigger indicator comprises at least one of an on/off indication or a sequence number for the trigger indicator using one or more bits of the trigger indicator.

25. The apparatus of claim 24, wherein the instructions are further executable by the processor to:
monitor a configured set of bits in a common control signaling to determine the sequence number for the trigger indicator.

26. The apparatus of claim 24, wherein the one or more bits of the trigger indicator are based at least in part on a resource identifier indicated in a downlink control indicator (DCI).

27. An apparatus for wireless communication, in a system comprising:
a processor;
memory coupled with the processor; and
instructions stored in the memory and operable, when executed by the processor, to cause the apparatus to:
transmit an uplink grant that conveys an indication of a multi-transmission opportunity (TxOP) grant and a transport block scaling factor;
receive, during a first TxOP, a first uplink transmission in one or more subframes in accordance with the multi-TxOP grant and the transport block scaling factor, wherein the first uplink transmission comprises a dense reference signal based at least in part on a medium captured for one or more repetitions of uplink data in the first uplink transmission in the first TxOP, and wherein the dense reference signal identifies the beginning of a first repetition of the uplink data in the uplink transmission during the first TxOP;
receive, during a second TxOP different from the first TxOP, a second uplink transmission in one or more subframes in accordance with the multi-TxOP grant and the transport block scaling factor; and
transmit a trigger indicator in the second TxOP during a subframe that is before the subframe in which the first or second uplink transmissions are transmitted, the trigger indicator indicating that repetitions of the uplink data are permitted to be transmitted during the second TxOP.

28. The apparatus of claim 27, wherein the instructions are further executable by the processor to:
transmit the trigger indicator in the first TxOP during a subframe that is before the subframe in which the first or second uplink transmissions are transmitted, the trigger indicator indicating that repetitions of the uplink data are permitted to be transmitted during the first TxOP.

29. The apparatus of claim 27, wherein the instructions are further executable by the processor to:
receive the dense reference signal during a first uplink subframe of the first TxOP; and
receive a second dense reference signal during a first uplink subframe of the second TxOP.

30. The apparatus of claim 27, wherein:
the uplink grant is received in a TxOP other than the first or second TxOPs.

* * * * *